(12) United States Patent
Chudnovsky et al.

(10) Patent No.: US 6,519,673 B1
(45) Date of Patent: Feb. 11, 2003

(54) MULTI-BANK, FAULT-TOLERANT, HIGH-PERFORMANCE MEMORY ADDRESSING SYSTEM AND METHOD

(76) Inventors: Gregory V. Chudnovsky, 94-11 69th Ave., Forest Hills, NY (US) 11375; David V. Chudnovsky, 54 Morningside Dr., Apt. 62, New York, NY (US) 10025

( * ) Notice: Subject to any disclaimer, the term of this patent is extended or adjusted under 35 U.S.C. 154(b) by 0 days.

(21) Appl. No.: 10/107,079

(22) Filed: Mar. 26, 2002

Related U.S. Application Data

(63) Continuation of application No. 09/472,930, filed on Dec. 27, 1999, now Pat. No. 6,381,669.

(51) Int. Cl.$^7$ .............................. G06F 12/00; G06F 9/00
(52) U.S. Cl. ........................... 711/5; 711/202; 711/203; 711/217
(58) Field of Search ............................ 711/5, 202, 203, 711/206, 217, 114; 365/230.03; 345/564

(56) References Cited

U.S. PATENT DOCUMENTS

| | | | |
|---|---|---|---|
| 5,043,874 A | 8/1991 | Gagliardo et al. | 364/200 |
| 5,063,526 A | * 11/1991 | Kagawa et al. | 345/572 |
| 5,367,494 A | 11/1994 | Shebanow et al. | 395/155 |
| 5,479,624 A | 12/1995 | Lee | 395/401 |
| 5,483,497 A | * 1/1996 | Mochizuki et al. | 365/230.03 |
| 5,497,478 A | 3/1996 | Murata | 395/484 |
| 5,526,507 A | * 6/1996 | Hill | 711/114 |
| 5,530,837 A | 6/1996 | Williams et al. | 395/434 |
| 5,684,973 A | 11/1997 | Sullivan et al. | 395/405 |
| 6,021,482 A | 2/2000 | Wu et al. | 711/217 |

OTHER PUBLICATIONS

Kuck, David J., et al., "The Burroughs Scientific Processor" (BSP), May 1982, IEEE Transactions on Computers, vol. C–31, No. 5, pp. 363–376.

Lawrie, Duncan H., et al., "The Prime Memory System for Array Access", May 1982, IEEE Transactions on Computers, vol. C–31, No. 5, pp. 435–442.

(List continued on next page.)

Primary Examiner—Matthew Kim
Assistant Examiner—Pierre M. Vital

(57) ABSTRACT

A memory addressing system for a multi-bank device that generally provides no band conflicts for stride 1 data access patterns and infrequent bank conflicts for power of 2 stride patterns or other access patterns of interest. In a preferred embodiment, the device comprises an address translation or remapping unit that remaps sequences of logical addresses into sequences of slightly aperiodic physical addresses such that the physical addresses do not form a repetitive pattern of period less than N+1, where N is the number of memory banks, and do not on average repeat a physical bank number within approximately N physical addresses. In large memory modules and embedded logic devices wherein multiple memory units communicate with multiple microprocessors in a single chip, the disclosed remapping combined with disclosed scrambling methods also achieves high tolerance of chip defects which would otherwise render chips unusable, thereby yielding manufacturing economies.

5 Claims, 35 Drawing Sheets

OTHER PUBLICATIONS

Tzu Yun–Kuei, et al., "An Analysis of a New Memory System for Conflict–Free Access", 1981, IEEE, pp. 318–324.

Jesshope, C.R., "Some Results Concerning Data Routing in Array Processors", Jul. 1980, IEEE Transactions on Computers, vol. C–29, No. 7, pp. 659–662.

Ashoke DEB, "Conflict–Free Access of Arrays—A Counter Example", Feb. 1980, Information Processing Letters, vol. 10, No. 1, p. 20.

Spahiro, Henry D., "Theoretical Limitations on the Efficient Use of Parallel Memories," May 1978, IEEE Transactions on Computers, vol. C–27, No.5, pp. 421–428.

Budnik, Paul, et al., "The Organization and Use of Parallel Memories", Dec. 1971, IEEE Transactions on Computers, pp. 1555–1569.

Raghavan, Ram, et al., "On Randomly Interleaved Memories", 1990, Proceedings of Supercomputing '90, IEEE, pp. 49–58.

* cited by examiner

S-BOX 12 (RIGHT)

SBOX_MULT 105 (LEFT)

S-BOX_MULT 105 (RIGHT)

RECODE8 250

DEC2E

MULTI-BANK, FAULT-TOLERANT, HIGH-PERFORMANCE MEMORY ADDRESSING SYSTEM AND METHOD

CROSS-REFERENCE TO RELATED APPLICATIONS

This a continuation of U.S. patent application Ser. No. 09/472,930, filed Dec. 27, 1999, now U.S. Pat. No. 6,381,669 entitled Multi-Bank, Fault-Tolerant, High-Performance Memory Addressing System and Method, which is hereby incorporated by reference.

FIELD OF THE INVENTION

This invention relates generally to a memory addressing system and method and, in particular, to a memory addressing system and method that provides high-performance access to a multi-bank memory having an arbitrary number of banks.

BACKGROUND OF THE INVENTION

For a conventional memory design to achieve the highest performance, the memory space is composed of individual components, typically called banks, whose number is typically a power of 2. The memory space is "interleaved" among the banks, meaning that consecutive addresses are typically mapped to different banks. The bank number in this case may be determined by simply looking at the lowest bits in the address, A: i.e., Bank=A mod $2^b$, where $2^b$ is the number, N, of banks. This approach has been used in high performance systems using as many as 512 banks of memory. Increasing the number of memory banks generally increases the throughput of memory and thus the bandwidth from the memory system to the processing unit. This throughput has traditionally been the weakest point in computer operations.

A known problem with this memory representation lies in the performance degradation it incurs when accessing arrays, or other data structures, with a stride which is even or divisible by a higher power of 2. For example, in a 16-bank system, accesses of stride 16 result in the worst performance, since only one of 16 banks is accessed. In many practical applications, array accesses have strides divisible by a high power of 2. For example, in matrices of sizes $2^m \times 2^m$, for $m \geq b$, column accesses give only 1/N of the peak performance, since whole columns reside in the same memory bank. Similar performance degradation occurs for other types of explicit patterns of accesses (i.e., explicitly defined sequences of accesses, which are commonly referred to as regular access sequences, e.g., diagonal accesses in the above matrices).

Another problem with this memory representation is its lack of fault tolerance, especially for memory devices having multiple memory banks inside a single chip. In such a single chip device, a single bad bank (i.e., a bank having at least one unusable memory location) typically results in either the whole memory device being discarded or the number of banks used being cut to the next lower power of two. This problem is particularly significant because the yield on new memory parts can be very low; thus, a part of the capacity of a plant that manufactures such devices is devoted to making unsellable product. The problem is further exacerbated in the new generation of multiprocessor chips having embedded memory units. Such a chip may, for example, comprise $2^b$ microprocessors and $2^b$ memory units (with, for example, 1 to 8 Mbits of DRAM per each unit), communicating with each other over, ideally, a full $2^b \times 2^b$ crossbar switching network. The memories in such chips may be treated in a shared memory model as a flat address space of $2^b \cdot 2^m$ memory locations, where $2^m$ is the size of each individual memory unit. Embedded memory chips are much more complex than ordinary memory units; accordingly, the cost of discarding or downgrading such chips is correspondingly greater than the cost of doing so for ordinary memory units.

Attempts to solve these problems have not been entirely successful.

For example, RAMBUS, and other similar technologies, attempt to alleviate the processor-memory bottleneck by providing faster memory operations to a non-banked memory or simply interleaved multi-bank memory. However, improvements are seen primarily for continguous memory requests only. In addition, as the speed of processing units increases dramatically, the bottleneck remains.

Another technique, addressed particularly to the bank conflict problem, is described in P. P. Budnick and D. J. Kuck, "The organization and use of parallel memories," IEEE. Trans. Computers, 20, pp. 1566–1569 (1971). Budnick et al. suggests implementing a memory using p banks of memory, where p is a prime number. In this case, bank conflicts for linear arrays can only occur for strides divisible by p. This, arguably, makes bank conflicts less likely in practice. However, there is a significant increase in the decoding logic—in particular, a full integer division by p circuit is required. For a requested address A, the remainder, A mod p, gives the address bank, while the quotient, A/p, gives the physical address within the bank. The early BSP (Burroughs Scientific Processor) has this type of memory system, with p=17. In addition to the increased decoding logic, this kind of solution is inadequate because limiting the number of banks to a prime number is too restrictive—for reasons of, e.g., placement, routing and interfaces, a non-prime number of banks, especially a power of 2, is a preferred choice.

Another remedy to the bank conflict problem is to use a pseudo-random number generator to generate a mapping between a logical address A and a corresponding bank. One such system is described, for example, in R. Raghavan, J. P. Hayes, "On randomly interleaved memories," *Proceedings of Supercomputing*, pp. 49–58, 1990. A pseudo-random generator generates a random sequence of output values for an ordered sequence of input values, but will always produce the same output value for a given input value. One problem with this technique is that is produces bank conflicts for stride 1 accesses. Stride 1 accesses are the most common access patterns in most computer applications (occurring for example when reading an instruction stream) and any significant degradation in memory performance for such accesses is therefore unacceptable. The general problem is that a pseudo-random, or truly random, mapping produces, on average, bank conflicts in not less than 1/e % (i.e., 36.78 . . . %) of accesses (where e is the base of the natural log), even for large N. This tends to substantially reduce peak performance. Additionally, certain known pseudo-random number generators may not uniformly map the address space across all banks (i.e., some banks may have more addresses mapped to them than others), which in turn increases bank conflicts and reduces performance.

Thus, while simple address translation schemes (the standard interleaving scheme or various schemes derived from Budnick-Kuck transition) create simple periodic sequences of bank numbers for sequences of fixed stride patterns (and thus suffer repeatable bank conflicts at many strides), general address scrambling mappings produce random sequences of bank numbers for arbitrary exact access sequences. These sequences of bank numbers, where the corresponding physical addresses reside, have, as explained above, statistically significant bank conflicts (within the sequence of N addresses), and, being sufficiently randomized, do not have a period less than the size of the address space to which the scrambling is applied.

Accordingly, a low complexity, fault tolerant scrambling technique that would generally provide conflict-free accesses for stride 1 access patterns, other explicit access patterns of particular importance, such as even stride patterns, power of 2 stride patterns, or diagonal and other access patterns of interest, is thus extremely desirable.

SUMMARY OF THE INVENTION

It is therefore an object of the present invention to provide a multi-bank memory addressing system and method which generally provides no bank conflicts for stride 1 access patterns and infrequent bank conflicts for other access patterns of interest. In one embodiment, a memory device is provided having a plurality, N, of memory banks comprising a plurality of addressable memory locations. Each memory location has a logical address and a corresponding physical address, the physical address comprising a memory bank number and a local address within the memory bank. The memory device comprises an address mapping system, including an address translation unit, that derives, for each logical address, the corresponding physical address. In a preferred embodiment, the address translation unit operates such that, for at least one explicit access sequence of logical addresses (for example, a sequence in which each logical address in the sequence is separated from another address in the sequence by a stride value), the derived physical addresses in the sequence of corresponding physical addresses have memory bank numbers that do not form a repetitive pattern having a period less than N+1 (or even a period less than the size of the address space) and do not on average repeat a bank number within approximately N addresses in the sequence of corresponding physical addresses.

The mapping performed by the address translation unit is referred to herein as "finite quasi-crystal mapping." The term derives from the fact that a translation unit in accordance with a preferred embodiment of the present invention produces, for most strides, a bank access pattern that is almost periodic (i.e., quasi-crystal-like); for example, the banks selected may generally be separated by a fixed value but occasionally separated by a different value. For illustration purposes, an example of quasi-crystal mapping for a given stride in a 16 bank memory system, where the banks are numbered 0 to 15, is 0, 2, 4, 6, 8, 10, 13, 15, 1, 3, 5, 7, 9, 12, 14, . . . . In this example, bank numbers in the sequence are generally separated by 2, but occasionally separated by some other number (such as 3, from 10 to 13 from 9 to 12). A preferred quasi-crystal mapping for a particular explicit access pattern is one in which each memory bank is accessed approximately the same number of times. In a preferred embodiment the discrepancy (here this term means the deviation of a given distribution of bank accesses from the uniform one) is minimal. This discrepancy per bank here is only O(1) (order 1).

The quasi-crystal mapping is, in one embodiment, performed by scrambling the addresses a using a modular transformation of the form:

$$a \rightarrow A = \Lambda a \bmod 2^K$$

where A is a scrambled address corresponding to a, $2^K$ is the address space (where K depends on the memory manufacturing process, and is, in the examples below, typically around 21 for a word aligned memory), and $\Lambda$ is an odd-valued constant. The bank number in this example is derived from the top bits of scrambled address A.

In order to get a finite quasi-crystal mapping in this scheme, $\Lambda$ is selected so as to minimize the deviation from a uniform distribution of bank numbers occurring in explicit access patterns of interest (such as various fixed stride or linear sequences of accesses in a two- or multi-dimensional table, including diagonal access patterns) over the $2^K$ address space.

The range of suitable $\Lambda$s may be narrowed using a variety of techniques. For example, minimizing the deviation from a uniform distribution of bank numbers is similar to the problem of minimizing the deviation from a uniform distribution of fractional parts $\{n \cdot \theta\}$. Consequently, multipliers $\Lambda$ that are similar to quadratic irrationalities give better uniform distribution properties. (See. e.g., H. Behnke, Zür Theorie der Diophantischen Approximationen, I, Abh. Math Sem. Hamburg 3 (1924), pp. 261–318). One recipe, inspired by the golden section $\tau = (\sqrt{5}-1)/2$ (approximately 0.6180), is to set $\Lambda$ to an integer close to $\tau \cdot 2^M$ for $M \leq K$. This is not the preferred embodiment and suffers from performance deficiencies. A better embodiment is described below.

Alternatively, the range of potentially suitable $\Lambda$s may be narrowed through the optimization of continued fraction expansion algorithms for rational numbers of the form $\Lambda/2^K$. See. e.g., Rockett and Szüsz, Continued Fractions, World Scientifica Publishing Co. Pte. Ltd. (1994). The optimization algorithm tries to find potentially suitable integer multipliers $\Lambda$ such that two conditions happen at the same time: (a) initial terms $a_i$ in the continued fraction expansion ($a_0$, $a_1$, $a_2$, ... ) of $\Lambda/2^M$ for $M \leq K$ are all small (for example, 1 or 2); and (b) the number of non-zero bits in the binary (or Booth-encoded binary) expansion of $\Lambda$ is minimal among multipliers satisfying condition (a). This non-linear optimization provides the best multiplier $\Lambda$ needed both for scrambling and for the minimal circuit implementation of the scrambler. The final choice of $\Lambda$ is based solely on the minimization of the deviation from the uniform distribution of bank access for various explicit access patterns over the address space. The deviation is computed through exhaustive simulation of bank access patterns for various strides, or other explicit access patterns, over the entire address space. Suitable $\Lambda$s can be selected by exhaustive computation of deviations for all possible values of $\Lambda$ (i.e., odd, and in the range $1 \leq \Lambda \leq 2^K$).

One skilled in the art would appreciate that various combinatorial circuit, table-lookup, or even analog solutions, rather than modular multiplication, can be used to construct the finite quasi-crystal mappings with the same effect of achieving low discrepancy mappings.

If all banks are defect free ($N=2^b$), the bank and local address can be derived from the scrambled address A as follows: the top b bits of A are the bank number of the rest of the bits of A are the local address in the bank.

If, however, one or more banks have defects, the address space shrinks to $N \cdot 2^m$ memory locations, where $N < 2^b$. In this case, it is necessary to translate a logical address a with a valid range $0 \ldots N \cdot 2^m - 1$ to a unique bank number u in the range of 0 ... N−1, and a local address la in the range 0 ... $2^m-1$. The complexity of the hardware logic that performs the translation is crucial.

It is especially important in multibank memory parts with an embedded logic, where multiprocessors communicate with multiple memory units inside the same chip. A general configuration of a multiprocessor chip with an embedded memory on the chip, would comprise $N=2^b$ microprocessors and $N=2^b$ memory banks (units) of size $2^m$ each (for example, 1 to 8 Mbits of DRAM each), communicating with each other over a switching network. Such switching network could be a full $2^b \times 2^b$ crossbar switch. As above, the total memories in this chip are treated in a shared memory model as a flat address space of $N \cdot 2^m$ memory locations. Since these translation units are needed for all multiprocessors inside the part, the ease of the hardware implementation of the address translation logic is crucial. As a practical example, we consider, here and below, b=6 case of 64 memory banks with 64 microprocessors, with each of the memory banks containing $2^{13}$ cache lines (up to 32 bytes per cache line). In this case the address space in the "defect free" case is $2^{19}$ of addressable locations (cache lines, say). Because of a relatively large chip area, defects with be common, and the number N of good processors can go down to 32 or even lower. These parts can be salvaged only with memory translation units. Construction of on-the-fly address remapping units with the additional scrambling properties described above are a crucial application for high bandwidth fault tolerant large memory modules, and, particularly, for a large system-on-a-chip product with embedded memory as multi-bank blocks.

The present invention provides several low cost solutions to the memory translation (remapping) problem, that also use the scrambling technique to achieve better fixed stride access (and other explicit patterns of accesses). These solutions are based on the general method of finite quasi-crystal mappings to achieve high performance. In the preferred embodiment such solutions use modular multiplication (with additional low discrepancy features).

One of the possible implementations is a novel way to subdivide the address space into N banks and to perform the scrambling at the same time. For example, for an address space of $2^K$ (as before), and N memory units (banks), where N is an arbitrary number, one first performs the scrambling mapping:

$$a \rightarrow A = \Lambda a \bmod 2^K$$

and then determines the unit number $u = A \cdot N/2^K$, where this memory location resides, with a local address $la = A - u \cdot 2^K/N$. Here N is a short constant, and $2^K/N$ is a (longer) constant. In addition to the standard scrambling, this approach requires only 2 multiplications by short (6-bit) numbers and addition/subtraction. One can merge various modular multiplications (scrambling and translation) into one block, to speed up the whole process, so that it is preferably completed in a cycle time T (~2.5) ns.

In the above example, the number of local sub-banks per unit is 1 (S=1). This is the simplest case of the general method described in detail below. There are schemes which operate for variable number N of banks and number S of sub-banks and are significantly better than this one and we recommend them for their minimal complexity and high performance. Such low complexity techniques for deriving bank number u and local address la from the scrambled address A are provided below in the detailed description of embodiments of the present invention.

COMMON SCHEMATIC BLOCKS EMPLOYED IN THE DRAWINGS

Figure 1:
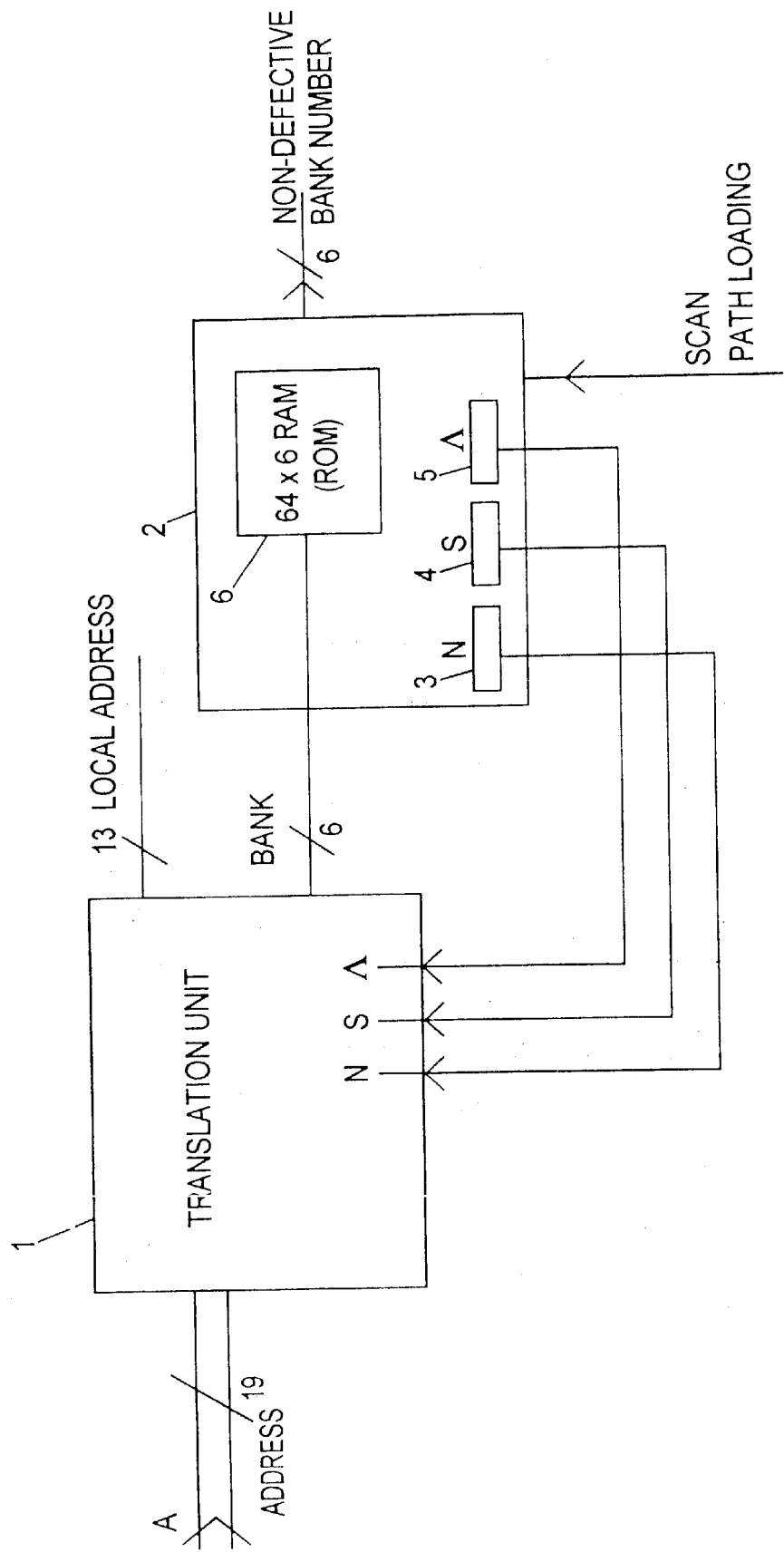
FIG. 1 is a block diagram of one embodiment of the memory addressing system of the present invention.

Common functional blocks employed in the hierarchical design schematics, as described in FIGS. 12–37, are listed below. They are logical blocks known to those skilled in the art, and are parametrized by one or more numbers. For each of the block types, one instance is depicted with full schematics in FIGS. 12–37.

| Block Names and Functional Descriptions. | |
|---|---|
| 1. Bits_N_K_L | Takes in N-bit bus A[N-1:0] and leaves only a sub-bus A[L:K]. |
| 2. AddN | An N-bit adder on A[N-1:0], B[N-1:0]. |
| 3. CSA | A carry-save (full) adder. |
| 4. CSA-N | An N-long array of CSAs with X[N-1:0], Y[N-1:0], Z[N-1:0] in; S[N-1:0], C[N-1:0] out. |
| 5. DECNE (where N is any number) | $\lceil \log_2 N \rceil$ to N decoder with enable E. |
| 6. GNDxN | Returns N grounds (0); Q[N-1:0] = 0. |
| 7. INS_N_M_L | Takes in A[N-1:0] inputs) and pads them at the bottom with L Grounds, inserts on the top as many A[J:0] bits as fit in M outputs, and if N + L < M, adds Ground(0) at the top of the result Q[M-1:0]. |

-continued

Block Names and Functional Descriptions.

| | | |
|---|---|---|
| 8. N_K_M | | This is the hardwired decimal constant K with M-bits of the output Q[M-1:0]. |
| 9. Pad_N_M | | Pads A[N-1:0] with M-N Grounds(0) to get M bits of the output. |
| 10. PDMuxN_M | | Predecoded Mux. Gets in N individual select lines S[N-1:0] and vector buses A[0][M-1:0], . . ., A[N-1][M-1:0] to get out Q[M-1:0]; |
| 11. Up_N_M | | Takes in A[N-1:0] and pads it on the bottom with M 0s (left shift by M). Result is N + M long. |
| 12. TrAddN | | N-bit. adder with the carry-in CI and a carry-out CO. |
| 13. SubN | | Subtracts unit of length N. |
| 14. CPM_N (Chopped product mux) | | Chooses in the decoded form from inputs 0, B[N-1:0], B[N-1:0] shifted left (only N-1 bits left) and not (B[N-1:0]), in that order. Select lines are A[2:0]. |
| 15. ProdMux_N | | Simple signed product of B[N-1:0] by $\{0,1,2,3 = -1\}$. Also adds VCC (= 1) on the top, N-th, bit. |
| 16. Recode | | Recodes 0,1,2,3, carry-in (CI) as 0,1,2,−1, carry-out (CO) in Radix 4 recoding. |
| 17. Recode_{6,8} | | Serially recodes 6 or 8 bits using Recode block. |

DETAILED DESCRIPTION

I. Power of Two Banks Embodiment

If the number of banks, N, is a power of two (i.e., $N=2^b$), an address translation unit in accordance with one embodiment of the present invention performs the following steps:

(1) Sets $A=\Lambda a \bmod 2^K$, where A is a scrambled address corresponding to logical address a, $2^K$ is the address space (where K is typically around 21 for a word aligned memory), and $\Lambda$ is an odd-valued constant; and (2) Sets the bank number to the top of A and the local address to the remaining bits of A.

$\Lambda$ is selected so as to minimize the deviation from a uniform distribution of bank numbers occurring in explicit access patterns of interest (such as various fixed stride or diagonal access patterns) over the $2^K$ address space. The selection of $\Lambda$ depends on user-requirements and the invention is not limited to any specific criteria. Suitable $\Lambda$s can be selected by, for example, exhaustive computation of deviations for all possible values of $\Lambda$ (i.e., $1 \leq \Lambda \leq 2^K$), via direct computer simulation, and selecting $\Lambda$s that minimize the deviation from uniform distribution of bank accesses for specific classes of explicit one- and multi-dimension memory access patterns that are of interest. In addition, analytic techniques based on number-theoretic properties of $\Lambda$s can be used to pre-select classes of $\Lambda$s with needed properties of minimal deviation from the uniform distribution; thus reducing the time needed for the exhaustive simulations.

The choice of modulus $2^K$ is preferred because the multiplication $\Lambda a \bmod 2^K$ can be implemented relatively simply in hardware, as those skilled in the art would appreciate. This scheme requires only a few gate delays in its implementation and thus adds at most one additional pipeline stage to the memory access. Modular multiplication, mod, say, $2^{16}$, occupies only half of the chip area (i.e., requires only half the gates) of a 16 bit fixed point multiplier. It is also sufficiently fast, because the multiplier $\Lambda$ is known in advance, and can be Booth encoded to reduce the number of stages in a (Wallace) multiplication tree. The complexity of the circuitry can be further reduced by fixing the value of $\Lambda$ in hardware.

A specific example of a quasi-crystal address mapping scheme in the case of a fairly typical multi-bank memory subsystem on-a-chip is presented below. In this specific example there are 16 memory banks on a chip and the stream of accesses is buffered by a FIFO on the input and a FIFO on the output of each memory bank. The buffering ensures proper in-order sequencing of memory accesses. The definition of bank conflict is base solely on the cycle time of each memory bank. In this example, which is representative of current advanced technology, the system cycle time is T ns (T~2.5), and each bank of memory has a cycle time of 10 T ns. (or even 8 T ns. in the next generation of the technology). Thus, conflict-free pattern of access is a somewhat relaxed condition. Bank conflicts occur in this example only if the same bank is accessed within ten successive memory requests. Conversely, if no bank conflict occurs among ten successive memory requests, the accesses are processed with no additional latency and at peak bandwidth of the system. Though the following discussion assumes exactly this memory organization, the invention is not limited to this organization and those skilled in the art will appreciate that specific manufacturers can have different organizations or different timing characteristics.

In this particular example, the use of pseudo-random or random mapping of logical to physical addresses in the memory will create memory conflicts and will significantly degrade the peak performance of the system. Here all explicit logic address access patterns, including the most important stride one pattern of accesses, will be turned into random accesses to the physical memory with the inevitable bank conflicts. For example, with a depth two FIFO on the inputs and outputs of the memory banks, the throughput is only 66%. Increasing the FIFOs to depth six increases the throughput to 96%, but at the expense of more than tripling the average latency.

$\Lambda$ may be selected, for example, to generate conflict-free bank accesses, and thus minimal latency, in memory accesses for all strides of sizes up to $O(2^M)$ that are not multiples of 13. The number 13 is the largest (and therefore best) number with this property, but other numbers, such as 11 or some other smaller prime, can be used. For example, for M=14, the scrambling multiplier $\Lambda$=3781 provides 100% memory utilization and minimal latency for all strides up to 350, not divisible by 13.

This specific example preserves conflict-free bank accesses for most strides and arbitrary numbers of memory banks (including, but not limited to, power of two number of banks), while providing the randomization of other accesses. This scrambler has a minimal complexity (its size is only linear in input/output) for a fixed multiplier Λ, which is important for a practical implementation of this addressing scheme since it reduces the number of gates in the circuit. Also, the patterns of bank accesses in this scrambling scheme for fixed stride arrays resemble finite quasi-crystal tilings. This example of a memory translation unit is characteristic of the address scrambling schemes in all of the preferred embodiments of the system disclosed herein.

Similar optimization in the choice of Λ can be used to minimize the deviation from uniform distribution of bank accesses for other sequences of logical addresses of strides greater than one and other explicit one- and multi-dimensional patterns of memory accesses. In another such example, Λ may be selected so as to provide conflict-free accesses for stride one (contiguous) arrays, 100% bandwidth for all higher strides (up to $O(2^M)$) not divisible by 89, but a higher latency of bank accesses than the minimal one for some strides under 89.

In this particular example of memory bank organization, the overall performance of the present invention, as determined in simulations, almost doubles the effective bandwidth of memory throughput to a single processor.

II. Arbitrary Number of Banks Embodiment

If, however, one or more banks have defects, the address space shrinks to $N \cdot 2^m$ memory locations, where $N<2^b$. In this case, it is necessary to translate a logical address a with a valid range $0 \ldots N \cdot 2^m - 1$ to a unique bank number u in the range $0 \ldots N-1$, and a local address la in the range $0 \ldots 2^m - 1$. The complexity of the hardware logic that performs the translation is crucial for applications (especially when such address translation unit has to be coupled with each processing unit in a multiprocessor system). In addition, memory bank sizes can be variable. This is typically accomplished by further subdividing each of N banks into S sub-banks (so that N and S are both variable). The memory address translation (and scrambling) unit is designed so that it will work when the number N of memory banks and the number of S of sub-banks can be set (dynamically) to any value less than or equal to the maximal one(s) available in the memory system.

Specific examples of low complexity techniques for deriving bank number u and local address la from the scrambled address A in this general situation are provided below.

A. Definitions/Underlying Assumptions

As used herein the term "logical address" refers to an address that a device external to the memory system uses to identify an item in memory. The term "physical address" refers to a physical memory location and comprises a bank number and a local address within the bank. There is one-to-one mapping of logical addresses to physical addresses over the entire address space.

This embodiment is described in connection with an N-bank memory, where $1 \leq N \leq 64$, in which each bank contains $S \cdot 2^{10}$ words, where $1 \leq S \leq 8$. A "word," or "cache line," is an addressable memory location and may be of arbitrary length. In typical memory systems, each addressable memory location comprises a predetermined number of bytes, e.g., 32 bytes. In this example, the address space is $N \cdot S \cdot 2^{10}$, for a maximum of $2^{19}$ valid words. All valid memory locations may accordingly be represented by logical 19-bit addresses, A, in the range $0 \leq A \leq N \cdot S \cdot 2^{10}$. Each logical address corresponds to a physical memory location, where a physical memory location is identified by a bank number and a local address within the bank; i.e., A→(Bank, Local), where $0 \leq Bank<N$, $0 \leq Bank<S \cdot 2^{10}$. The present invention is not limited to a memory having the above-described structure. for example, the present invention may be applied to a memory having more or less than 64 banks or more than $8 \cdot 2^{10}$ words per bank or less than $1 \cdot 2^{10}$ words per bank.

B. Description of Memory Addressing System

In the address translation and scrambling unit, according to a preferred embodiment, the bank number Bank (=u) and the local physical address Local (=la) are both determined from modular multiplications on several blocks of bits of the logical address A, and then selecting bit-ranges of the corresponding results. This principle is applied very simply in the case of $N=2^b$ as described above, and is applied with minor variations for arbitrary number N of banks and number S of sub-banks. Modular multiplication is used here as a means to construct a finite quasi-crystal mapping for the memory translation unit (one of many possible means, but the preferred one in this embodiment).

FIG. 1 is a block diagram of a memory addressing system for an arbitrary number of banks in accordance with the present invention. Translation unit 1 receives, in this embodiment, a 19-bit logical address, A, the number of banks, N, the number of sub-banks, S, and multiplier Λ and translates logical address A into a 6-bit bank number and a 13-bit local address, which are then output. The bank number is then used to address non-defective bank table 6 in memory section 2, which in turn maps the bank number to a physical bank number of a non-defective bank. The physical bank number and local address is used to address an attached memory device. Non-defective bank table 6 is preferably a writable memory (such as a RAM). Alternatively, it can be read-only memory (ROM) if set only once, such as after initial testing of the attached memory device. In one embodiment, the non-defective bank table 6 is a 64×6 bit table in which the row number corresponds to a logical bank number and the contents of the table at each row provides the corresponding physical bank number of a non-defective bank. If there are fewer than 64 banks, not all rows in the table will be used. Memory table 6 is shown as a 64×6 bit memory since there is a maximum of 64 valid banks in this example. Of course, a larger memory is needed if the memory system has more banks and a smaller one is needed is the memory system has fewer banks.

The values for N, S and Λ are stored in registers 3, 4 and 5, respectively, in memory section 2. Alternatively, these values may be stored in read-only memory or hardwired.

Figure 2:
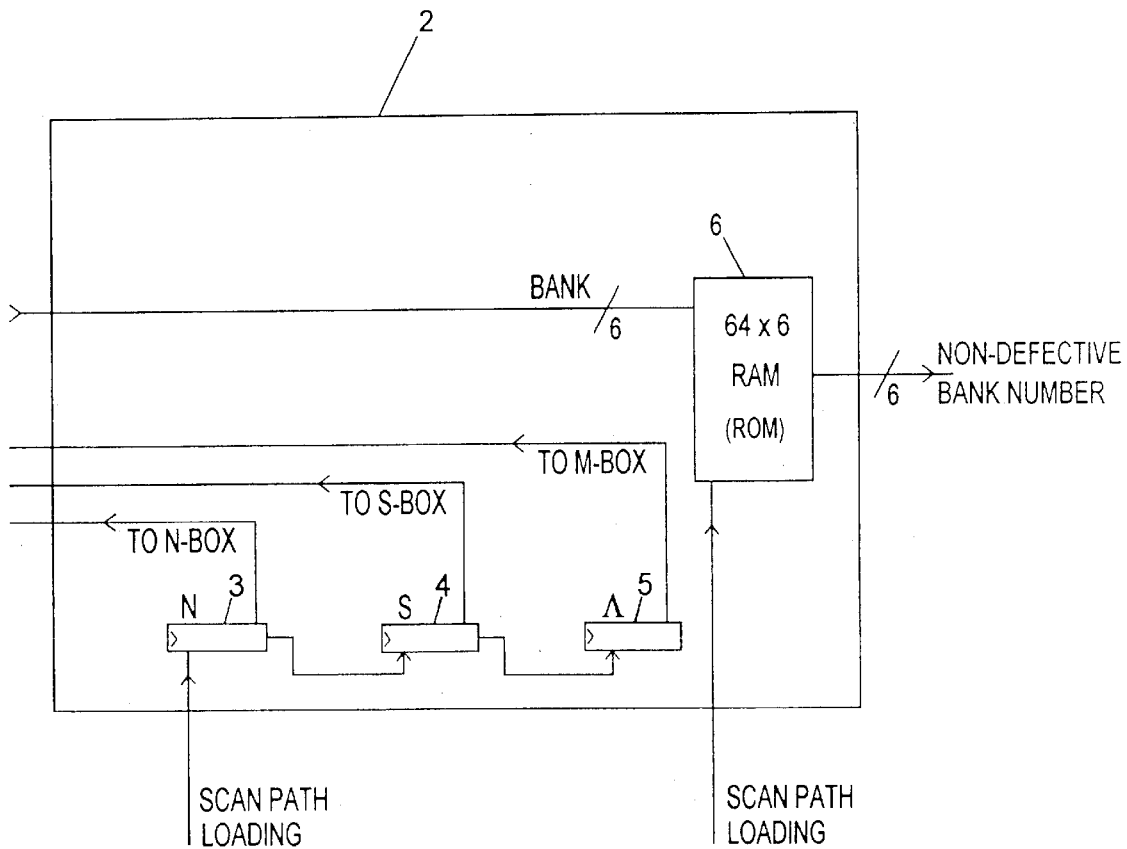
FIG. 2 is a block diagram of the memory section of one embodiment of the present invention.

Preferably, registers 3, 4 and 5 and non-defective bank table 6 are configured so that they can be updated using, for example, scan path loading, as illustrated in FIG. 2 (N.B., identical numbers in different figures refer to identical components.) Using the technique, values for N, S and Λ are entered in register 3; each bit entered in register 3 right shifts the contents of registers 3, 4 and 5, with the last bit of register 3 being shifted to register 4 and the last bit of register 4 being shifted to register 5, until all three registers are filled with the desired values. The values in non-defective bank table 6 are similarly set.

Figure 3:
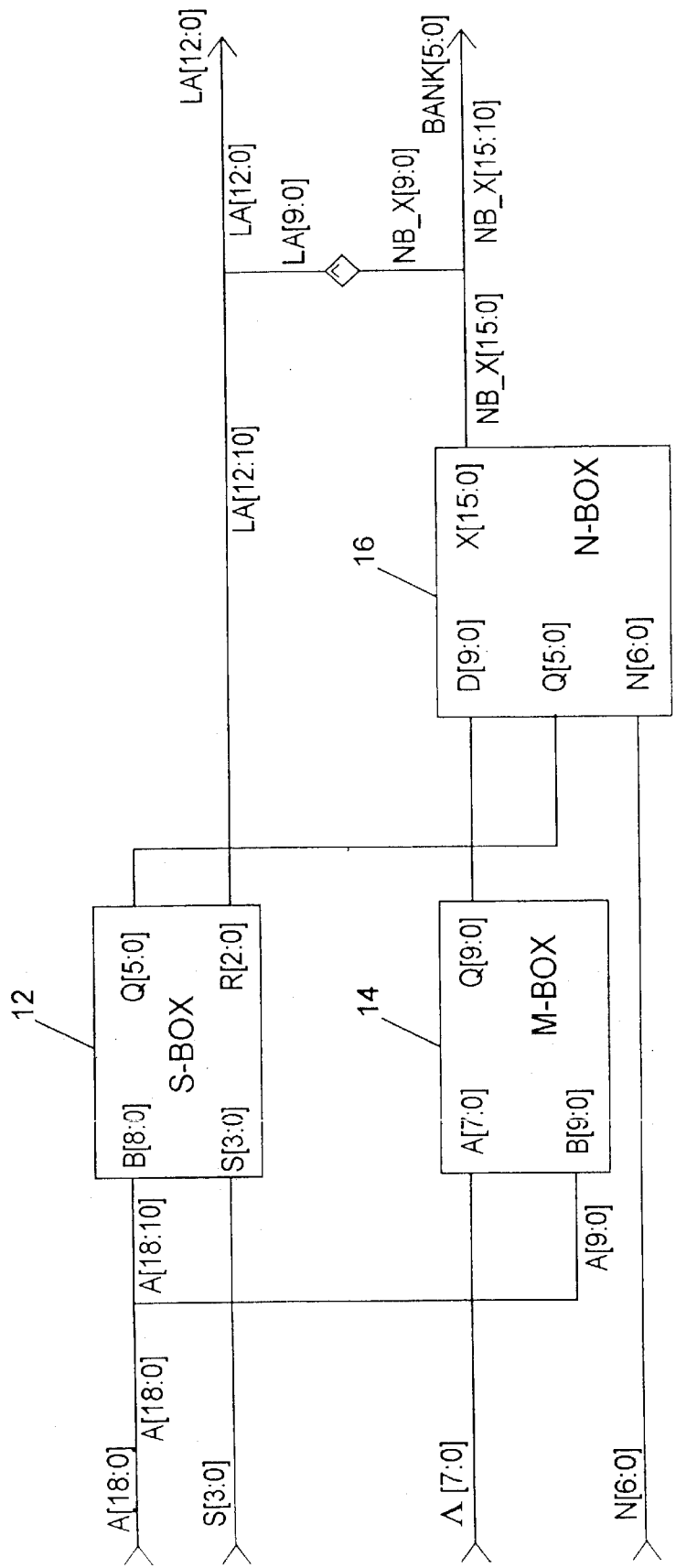
FIG. 3 is a block diagram of the translation unit of one embodiment of the present invention.

FIG. 3 is a block diagram of translation unit 1. S-Box 12 receives the top 9 bits of A (i.e., A[18:10], referred to below as $A_{top}$) at its B input and S at its S input. It produces the quotient, Q, and remainder, R, of $A_{top}/S$, where S, in this embodiment, is a value between 1 and 8, inclusive; i.e., $A_{top}=Q \cdot S+R$. Q and R may be efficiently derived as follows: $Q=(L(S) \cdot A_{top}+C(S))[upper:lower]$, where L(S) and C(S) are constants depending only on S, and [upper:lower] specifies a bit range. L(S) and C(S) may be stored, for example, in registers or implemented in hardware. R is then $A_{top}-Q \cdot S$ mod 8; i.e., the 3 lowest bits of $A_{top}$-S·Q. The values for L(S) and C(S), $1 \leq S \leq 8$, for bit range [15:10] are as follows:
Case S=1→L=1024, C=0
Case S=2→L=512, C=0
Case S=3→L=342, C=0
Case S=4→L=256, C=0
Case S=5→L=205, C=0
Case S=6→L=171, C=0
Case S=7→L=146, C=128
Case S=8→L=128, C=0

Alternatively, Q may, for example, be determined as follows:
Case S=1→Q=($A_{top}$·128)[12:7] or Q=$A_{top}$[5:0]
Case S=2→Q=($A_{top}$·64)[12:7] or Q=$A_{top}$[6:1]
Case S=3→Q=($A_{top}$·171)[14:9]
Case S=4→Q=($A_{top}$·32)[12:7] or Q=$A_{top}$[7:2]
Case S=7→Q=($A_{top}$·73+64)[14:9]

Figure 4:
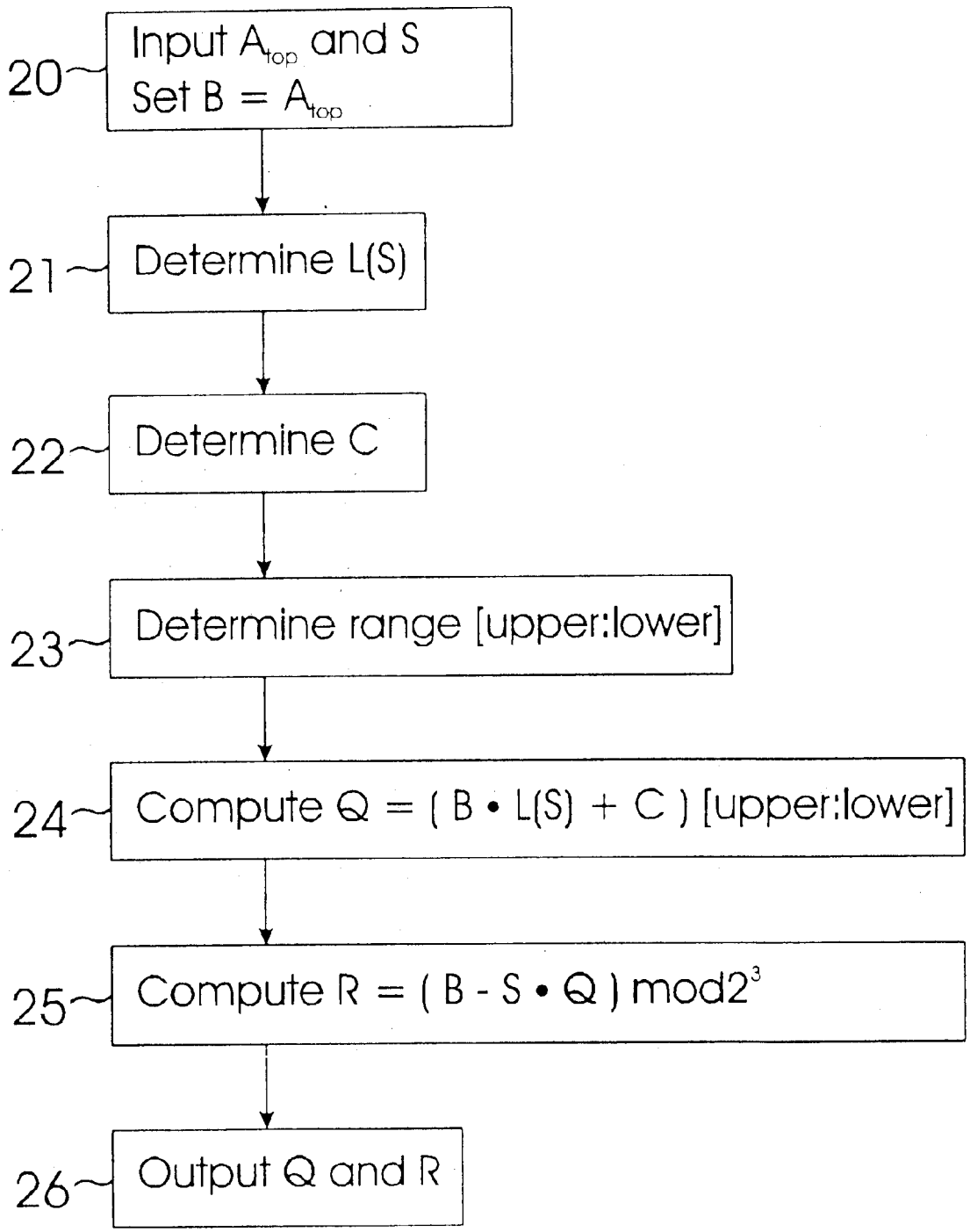
FIG. 4 is a flowchart illustrating the operation of S-Box.

FIG. 4 illustrates the above process for determining Q and R. In step 20, the values of $A_{top}$ and S are input and B is set equal to $A_{top}$. In step 21, 22 and 23, the values of L(S), C and the range [upper:lower], respectively, are determined based on the value of S. In step 24, quotient Q is set to (B·L(S)+C)[upper:lower]. In step 25, R is set to (B−S·Q) mod 8. In step 26, Q and R are output.

Figure 5:
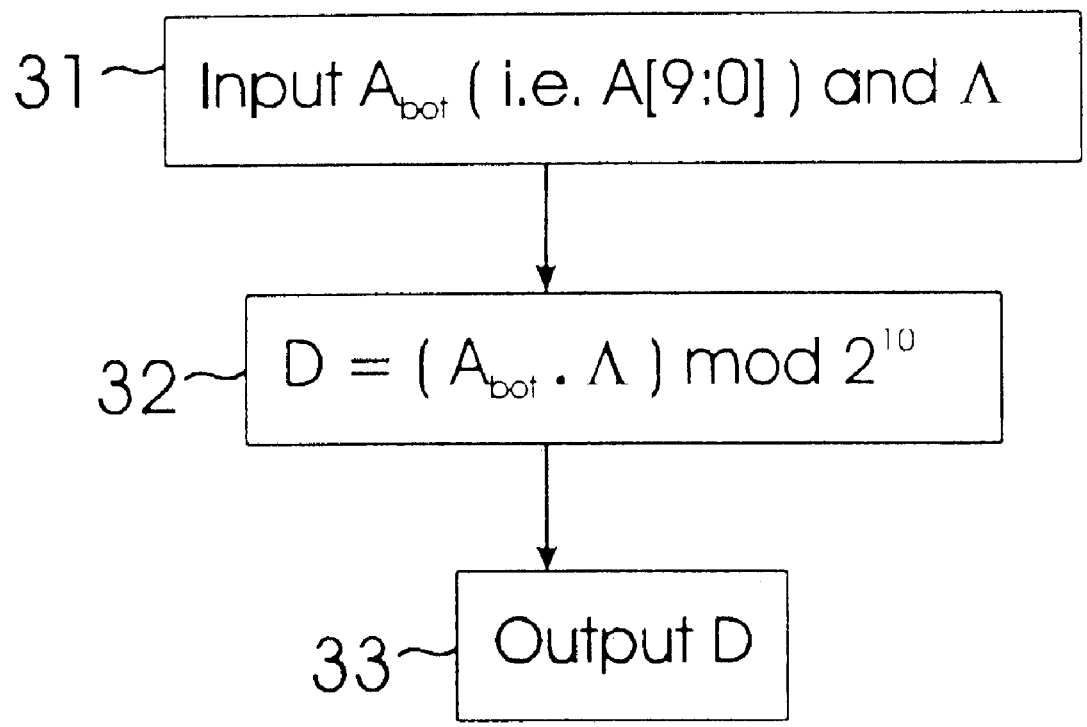
FIG. 5 is a flowchart illustrating the operation of M-Box.

Referring back to FIG. 3, M-Box 14 (a) receives the bottom 10 bits of A (i.e., A[9:0], referred to as $A_{bot}$) at its B input, and multiplier Λ at its A input, (b) computes D=($A_{bot}$·Λ) mod $2^{10}$, and (c) outputs the result D on its Q output. This process is illustrated in steps 31, 32 and 33, respectively, of FIG. 5.

Suitable Λs are again determined, for example, by exhaustive computation; i.e., by using various values in the translation unit described herein and determining the Λ values that produce optimal bank access patterns for particular values of N and S. As described above, a conflict occurs when two logical addresses are mapped to the same bank number. Thus a conflict must occur at least once every N+1 accesses. Again, an optimal bank access pattern is one in which bank conflicts are minimized for explicit access patterns of interest, such as fixed stride patterns and linear two- and multi-dimensional patterns of access (including diagonal patterns of access in matrices). In a preferred embodiment, stride 1 conflicts and conflicts for other explicit access patterns of interest (including fixed stride patterns) should occur on average no more than approximately every N accesses. The Λs that generate the fewest bank conflicts for various strides are best. An address translation unit constructed in accordance with the teachings of this specification, including an address translation unit employing modular multiplication or one of the other alternatives described below, avoids the drawbacks of, for example, the pseudo-random mapping described above in the "Background of the Invention."

Preferred Λs for various values of N, optimized for low range strides and especially stride 1, are provided below; the same values apply for all S in the allowed range, $1 \leq S \leq 8$:
N=33, Λ=33, 83, 99, 165, 231, 247, 249, 353, 415, 459;
N=34, Λ=25, 33, 83, 99, 165, 231, 247, 249, 353, 415, 459;
N=35, Λ=25, 33, 75, 83, 99, 119, 165, 231, 247, 249, 381, 415, 459;
N=36, Λ=25, 33, 75, 83, 99, 119, 165, 231, 247, 249, 381, 415;
N=37, Λ=25, 33, 75, 83, 99, 119, 165, 231, 249, 381, 415;
N=38, Λ=25, 75, 83, 119, 165, 231, 249, 381, 415;
N=39, Λ=25, 75, 83, 119, 231, 249, 305, 381, 415;
N=40, Λ=25, 75, 83, 119, 249, 305, 381;
N=41, Λ=25, 75, 83, 119, 209, 249, 305, 381;
N=42, Λ=25, 75, 83, 119, 209, 249, 305, 381;
N=43, Λ=25, 75, 83, 87, 119, 209, 249, 305, 381, 425;
N=44, Λ=25, 87, 119, 209, 249, 305, 381, 425;
N=45, Λ=25, 87, 119, 209, 305, 381, 425, 483;
N=46, Λ=25, 87, 209, 305, 381, 425, 483;
N=47, Λ=25, 87, 209, 305, 381, 425, 483;
N=48, Λ=25, 87, 209, 305, 381, 425, 483;
N=49, Λ=109, 209, 305, 381, 425, 483;
N=50, Λ=109, 209, 305, 381, 425, 483;
N=51, Λ=109, 209, 243, 305, 425, 483;
N=52, Λ=109, 209, 243, 305, 425, 483;
N=53, Λ=109, 209, 235, 243, 305, 397, 483;
N=54, Λ≤109, 209, 235, 243, 305, 397, 483;
N=55, Λ=109, 209, 235, 243, 319, 397, 483;
N=56, Λ=209, 235, 243, 319, 397, 483;
N=57, Λ=107, 235, 243, 319, 483;
N=58, Λ=107, 235, 243, 319, 483;
N=59, Λ=107, 235, 243, 319, 483;
N=60, Λ=107, 235, 243, 319, 483;
N=61, Λ=107, 235, 243, 319, 483;
N=62, Λ=107, 235, 243, 319;
N=63, Λ=107, 235, 243, 375;
N=64, Λ=107, 235, 243, 375.

Referring back to FIG. 3, N-Box 16 receives the Q output of S-Box 12 on its input; the output of M-Box 14 on its D input, and the number of banks, N, on its N input. N-Box 16 computes and outputs the bank number and lower order 10 bits of the local address, LA[9:0], as described in FIG. 6. The lower order 10 bits of the local address output from N-Box 16 are combined with the high order 3 bits, LA[12:10], for the R output of S-Box to make the entire local address.

Figure 6:
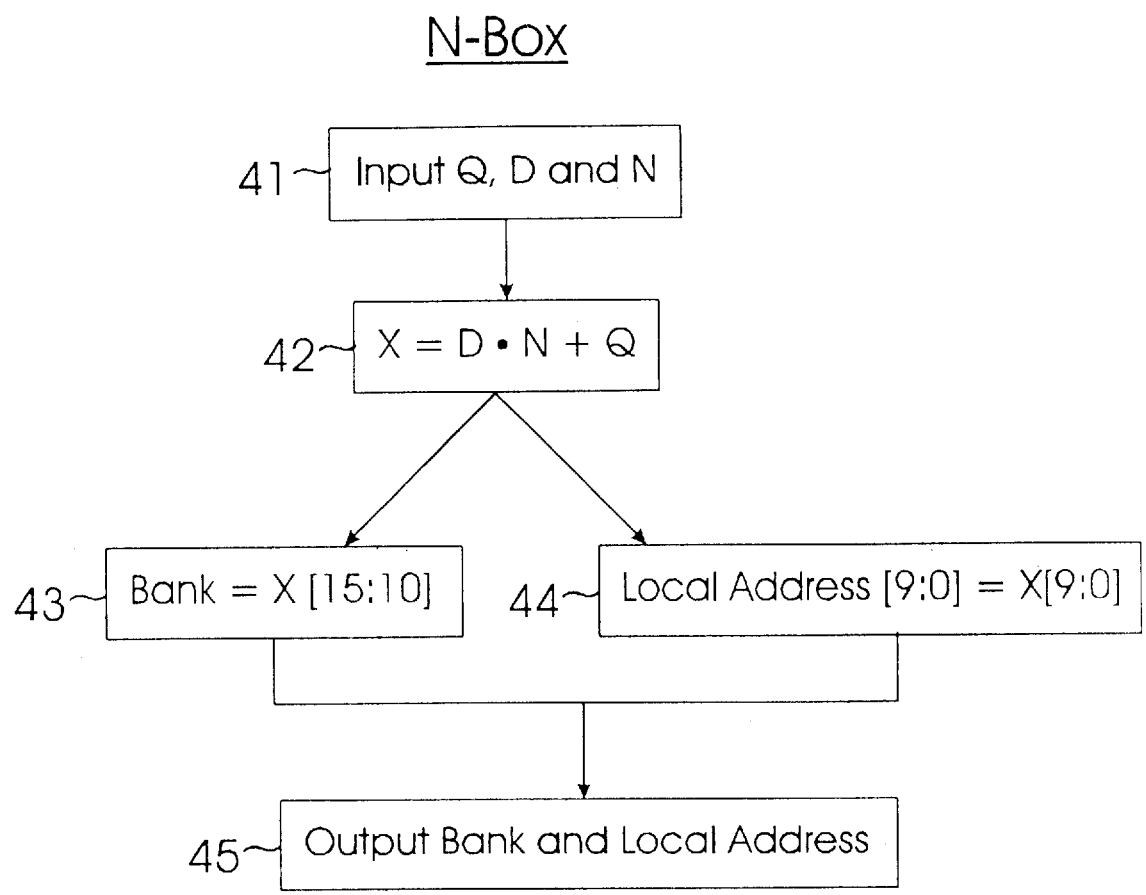
FIG. 6 is a flowchart illustrating the operation of N-Box.

The process performed by N-Box 16 is illustrated in FIG. 6. In step 41, Q, D and N are input, Step 42 sets X to D·N+Q. Step 43 sets the logical bank number to bits [15:10] of X; i.e., Logical Bank=X[15:10]. Step 44 sets bits [9:0] of the local address to X[9:0]; i.e., Local Address[9:0]=X[9:0]. Step 45 outputs the logical bank number and the low order bits of the local address.

The logical bank number is then sent to and used to address the non-defective bank table 6, as described above in connection with FIG. 1.

Provided below is an example of the operation of S-Box 12, M-Box 14 and N-Box 16 for N=64, S=8, Λ=235 (=$2^8$−$2^4$−$2^2$−$2^0$) and logical address A=0x3DF29 (or 0111101111100101001 in binary):

|  | decimal | hexadecimal | binary |
|---|---|---|---|
| A | 253737 | 3DF29 | 0111101111100101001 |
| S-Box |  |  |  |
| $A_{top}$ | 247 | 0F7 | 011110111 |
| S | 8 | 8 | 1000 |
| L(S) | 128 | 80 | 1000000 |
| ($A_{top}$·L(S)) | 31616 | 7B80 | 0111101110000000 |
| Q = ($A_{top}$·L(S))[15:10] | 30 | 1E | 011110 |
| R = ($A_{top}$−S·Q) mod $2^3$ | 7 | 7 | 111 |
| M-Box |  |  |  |
| $A_{bot}$ | 809 | 329 | 1100101001 |
| Λ | 235 | EB | 11101011 |
| ($A_{bot}$·Λ) | 190115 | 2E6A3 | 00101110011010100011 |
| D = ($A_{bot}$·Λ) mod $2^{10}$ | 675 | 2A3 | 1010100011 |
| N-Box |  |  |  |
| N | 64 | 40 | 01000000 |
| X = D·N + Q | 43230 | A8DE | 1010100011011110 |
| X[15:10] | 42 | 2A | 101010 |
| X[9:0] | 110 | 6E | 0011011110 |

-continued

|  | decimal | hexadecimal | binary |
|---|---|---|---|
| Output |  |  |  |
| Local[12:10] = R | 7 | 7 | 111 |
| Local[9:0] = X[9:0] | 110 | 6E | 0011011110 |
| Local | 7390 | 1CDE | 1110011011110 |
| Bank | 42 | 2A | 101010 |

This embodiment was described in connection with a $2^K$ address space, where K=19. It can also be applied without any further modifications to an arbitrary address space where K>19 by, for example, deriving the bank number using a 19-bit subset of the addresses (such as the low order 19 bits). The local address can derived in this case by, for example, appending the local address derived from the 19-bit subset to the unused bits of the K-bit address.

Alternatively, the technique described in this embodiment can be easily adapted for any of the following ranges of values: K, either larger or smaller than 19; N, larger or smaller than 64; S, larger or smaller than 8. In such a modification, the choice of the parameter Λ is made according to the principles of quasi-crystal mappings described above. The performance of the address translation unit, built from appropriately modified S-, M-, and N-Boxes with a proper choice of Λ improves as K increases (for K>19).

C. Hardware Implementation

A hardware implementation for the embodiment shown in FIGS. 1–6 is depicted in the hierarchical schematics shown in FIGS. 12–37. The implementations of low level blocks in these schematics are presented for illustrative purposes and in production will be implemented in library and technology specific fashion. One skilled in the art will understand the range of specific implementations and can choose an appropriate one that is library and process specific. For example, in newer technology one will use buffers to minimize wire length while in the older technology longer wires with less gate delays are preferable.

Figure 12A:
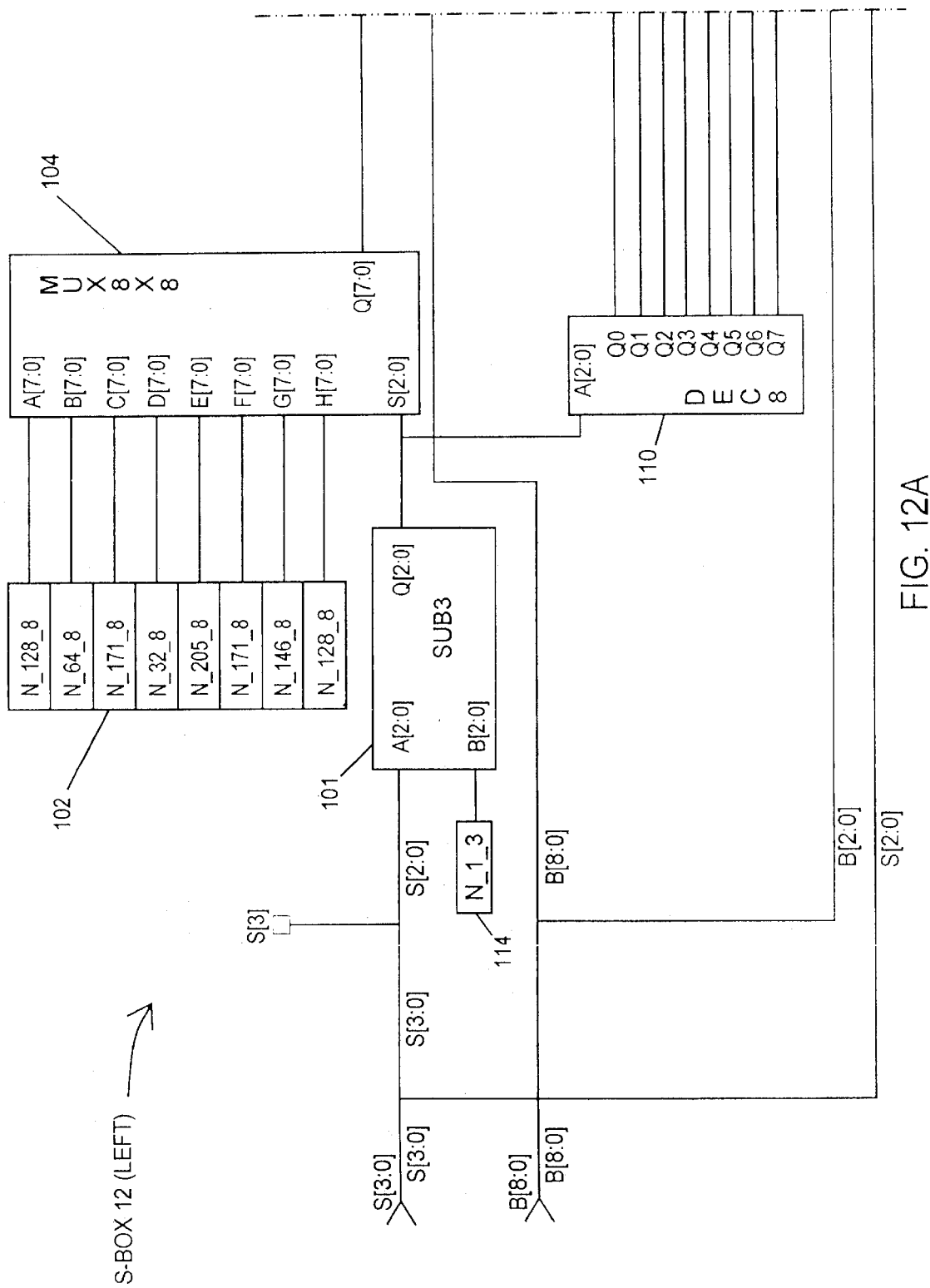
FIGS. 12–37 are hierarchical schematics of a hardware implementation of an embodiment of the present invention.
Figure 12B:
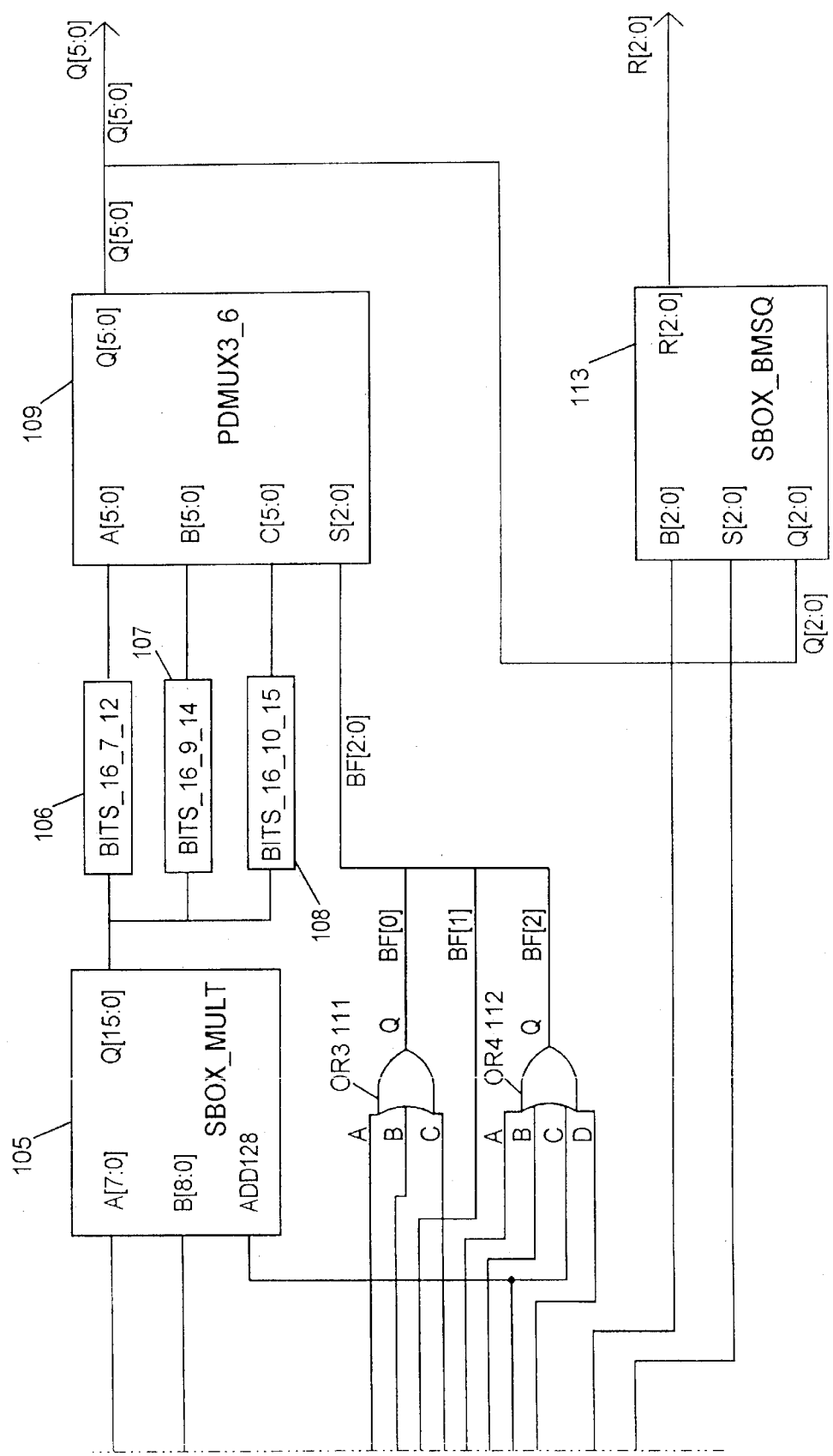

FIG. 12 depicts a hardware implementation of S-Box 12. Sub3 101 receives the four bit constant S[3:0] and the value 1, from hard-wire constant 114 (or, alternatively, from a register), and subtracts 1 from S. This converts S from the range 1 to 8, inclusive, to 0 to 7, inclusive, for use as an index. The result is sent to the S input of multiplexer MUX8x8 104, for selecting the corresponding L(S), and to decoder DEC8 110, for determining the corresponding values of C and the range [upper:lower].

Multiplexer MUX8x8 104 selects and outputs one of eight input values A–H based on input value S. Those input values (corresponding to L(S) in FIG. 4) are received from constant bank 102. As shown, constant bank 102 contains the following hard-coded constants in positions 0 through 7, respectively: 128, 64, 171, 32, 205, 171, 146 and 128. Alternatively, the values in bank 102 can be stored in registers.

Decoder DEC8 110 also receives the output of box Sub3 101 and sets one of its outputs, Q0–Q7, high based on the received value (e.g., Q0 is set high is the received value is 0, Q1 is set high if the received value is 1, etc.).

SBox_Mult 105 computes B·L(S)+C, where C equals 128 for S=7 and 0 otherwise, and outputs the result on its Q output. It receives L(S) from multiplexer 104 on its A input and the top 9 bits of logical address A, designated B[8:0], on its B input. In this embodiment, C is non-zero only for S=7, in which case 1 is output from the Q6 output of decoder DEC8 110 and sent to the ADD128 input of Sbox_Mult 105.

Elements 106, 107 and 108, PDMux3_6 109, and OR gates 111 and 112 select a range of bits (i.e., [upper:lower]) from the output of Sbox_Mult 105. The range depends on the output of decoder DEC8 110. Element 106 directs bits Q[12:7], where Q here is the output of Sbox_Mult 105, to input A of PDMux3_6 109; element 107 directs bits Q[14:9] to input B of PDMux3_6 109; and element 108 directs bits Q[15:10] to input C of PDMux3_6 109. PDMux3_6 109 is a predecoded multiplexer having three individual select lines, S[2:0], only one of which will be logic 1, which select and output one of three corresponding inputs, A, B or C. In this embodiment, input A (range [12:7]) is selected is S equals 1, 2 or 4 (i.e., output Q0, Q1 or Q3 from decoder DEC8 110 to OR gate 111 is logic 1 ), input B (range [14:9]) is selected if S equals 3 (i.e., output Q2 from decoder DEC8 110 is logic 1), and input C (range [15:10]) is selected if S equals 5, 6, 7 or 8 (i.e., output Q4, Q5, Q6 or Q7 from decoder DEC8 110 to OR gate 112 is logic 1). The output of multiplexer PDMux3_6 109 corresponds to the Q output of S-Box 2 shown in FIG. 1.

SBox_BMSQ 113 computes (B−S·Q) mod $2^3$; in particular, it receives B[2:0], S[2:0], and the three lower order bits of the output of multiplier 109 on its B[2:0], S[2:0] and Q[2:0] inputs, respectively, and outputs the result on its R output. The inputs are only 3 bits each because the calculation only determines the 3 low order bits of the result (i.e., it is mod $2^3$).

Figure 14A:
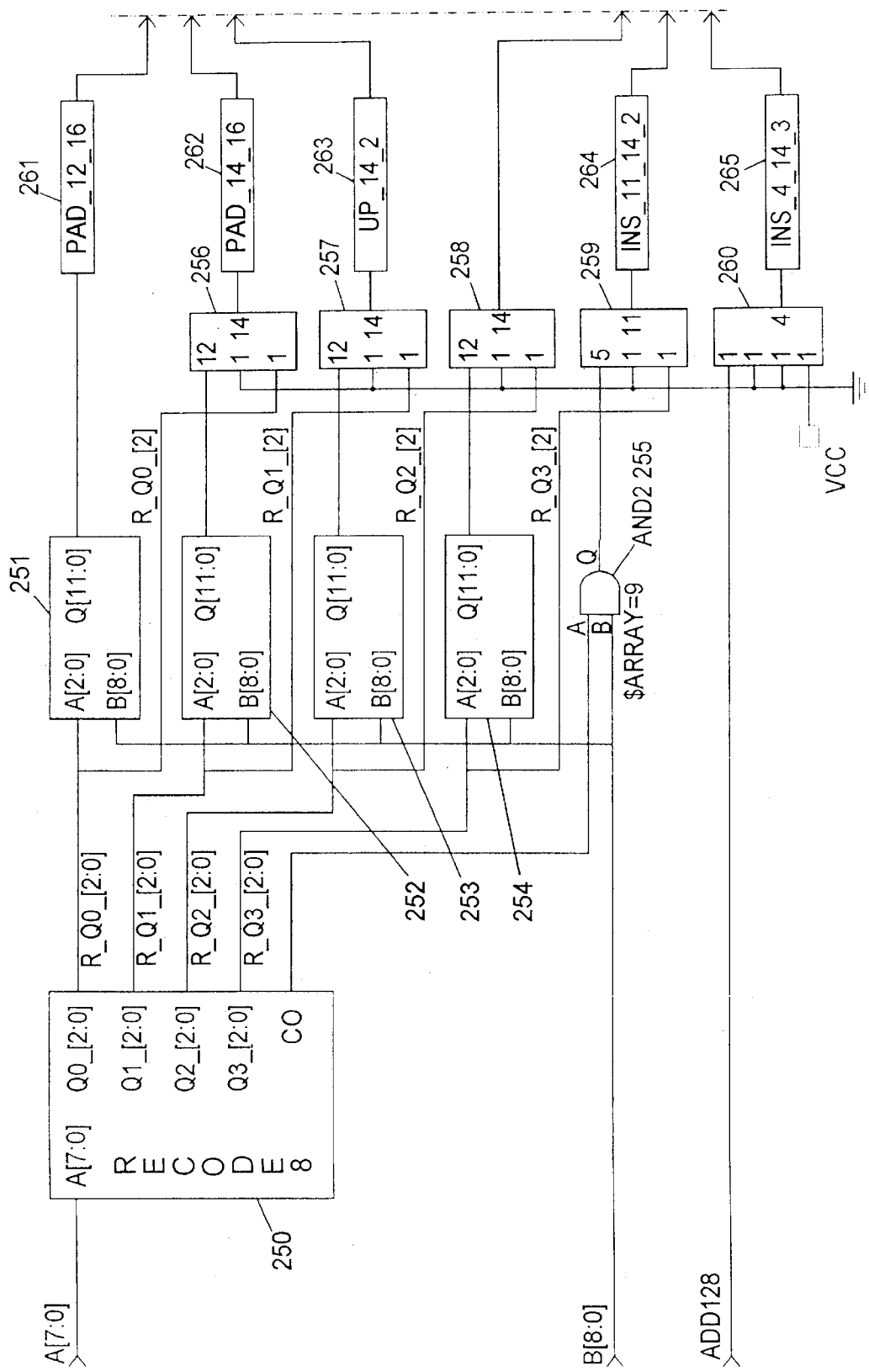
Figure 14B:
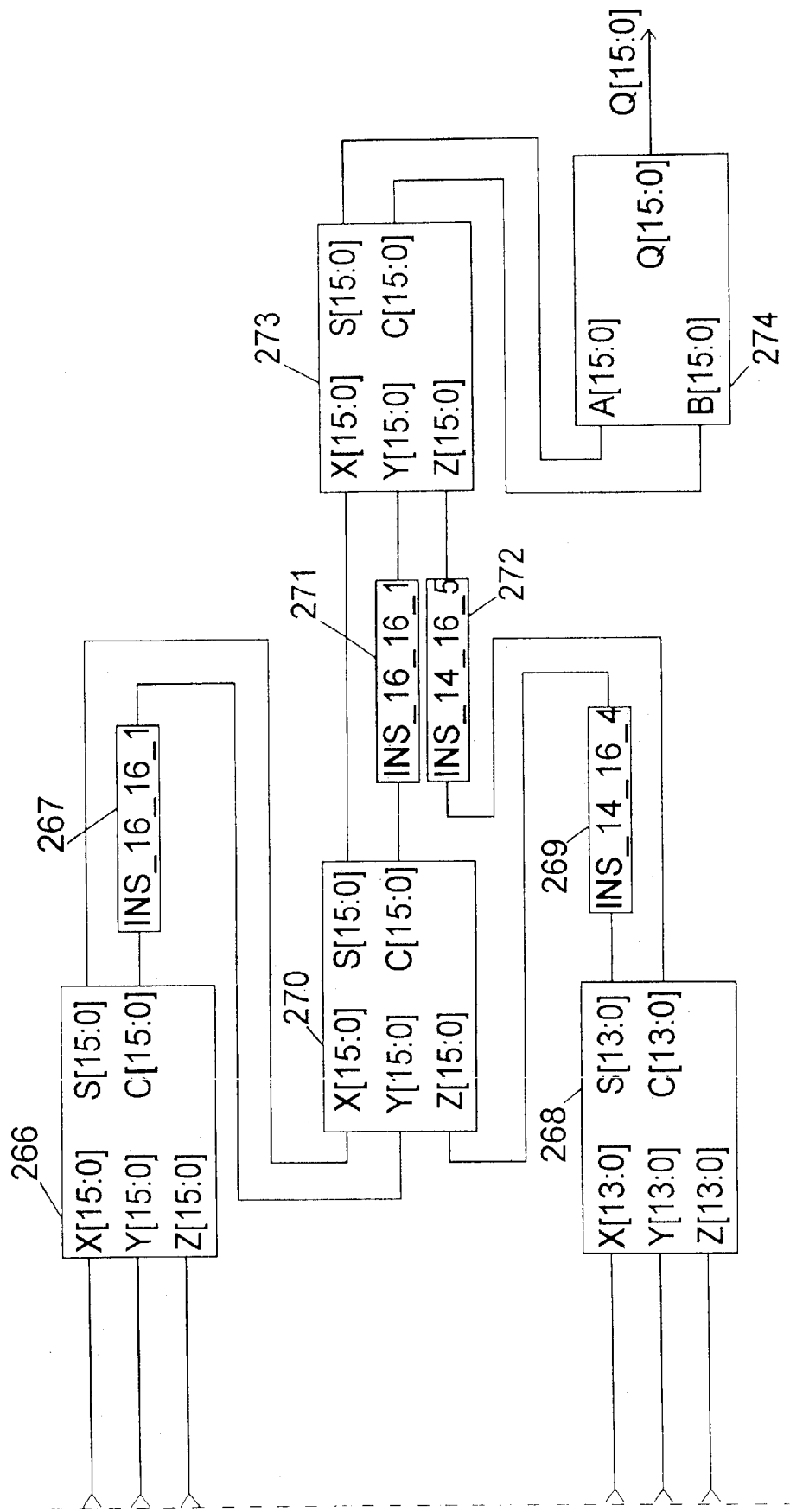
Figure 15:
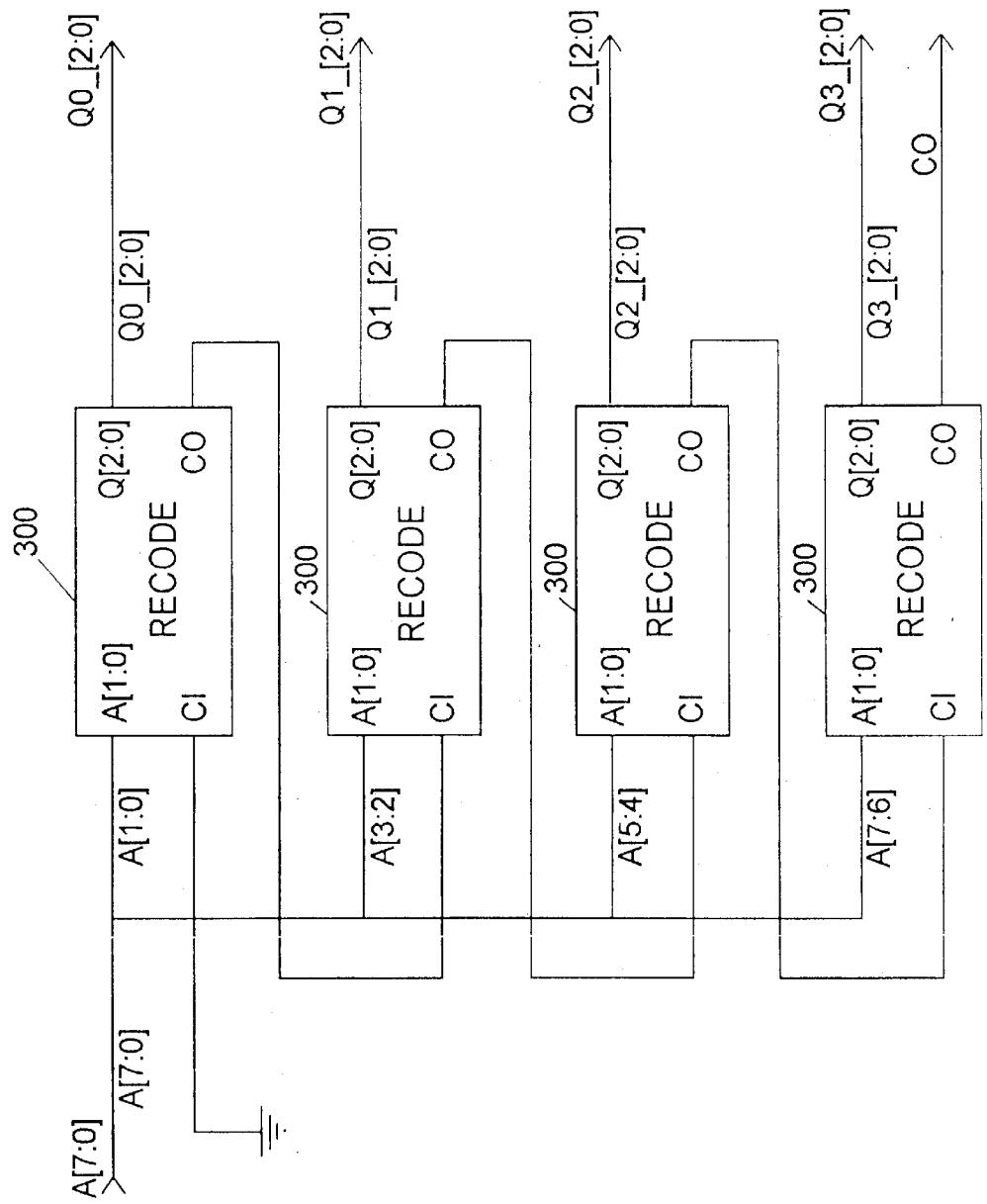
Figure 16:
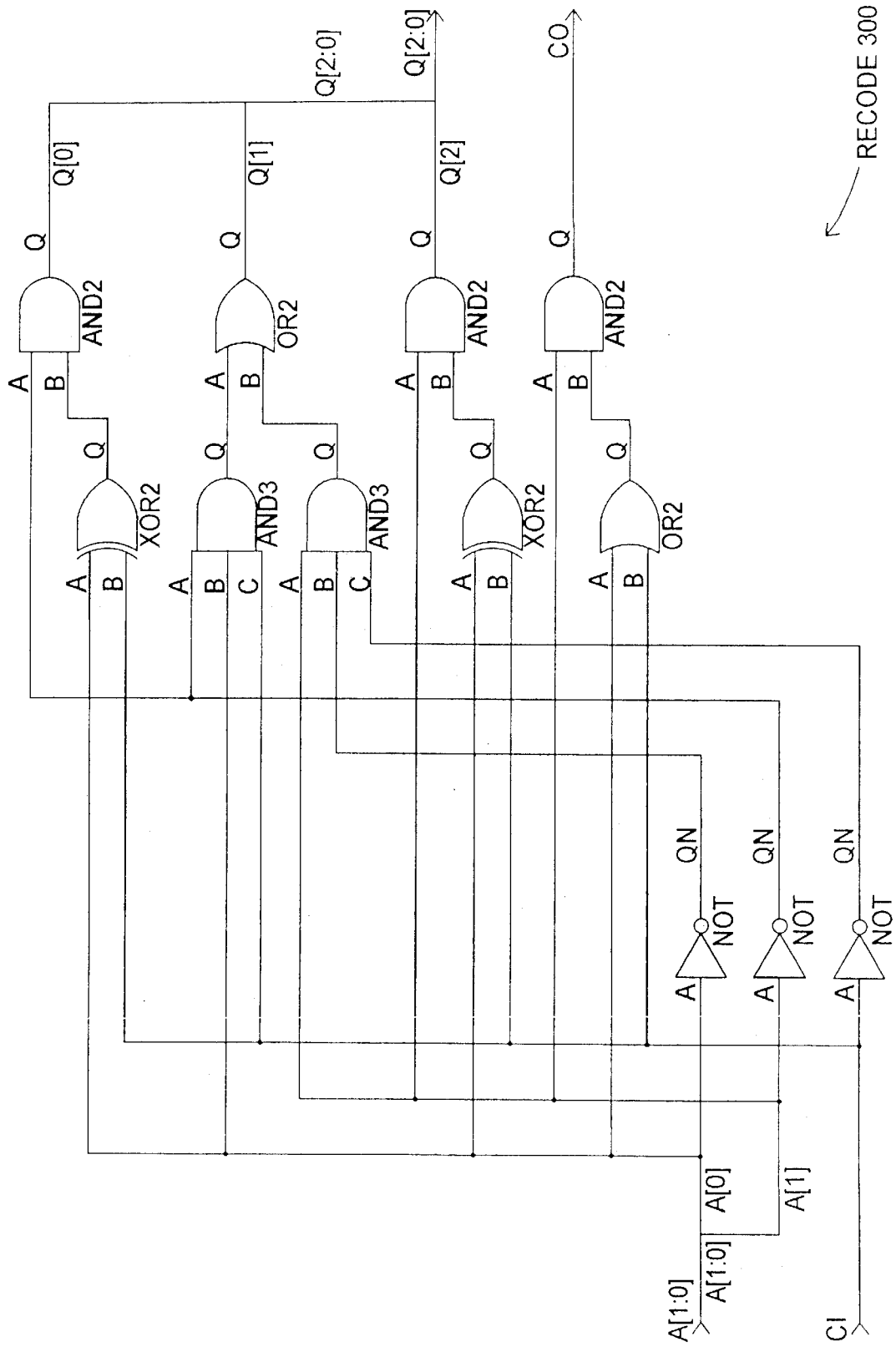
Figure 17:
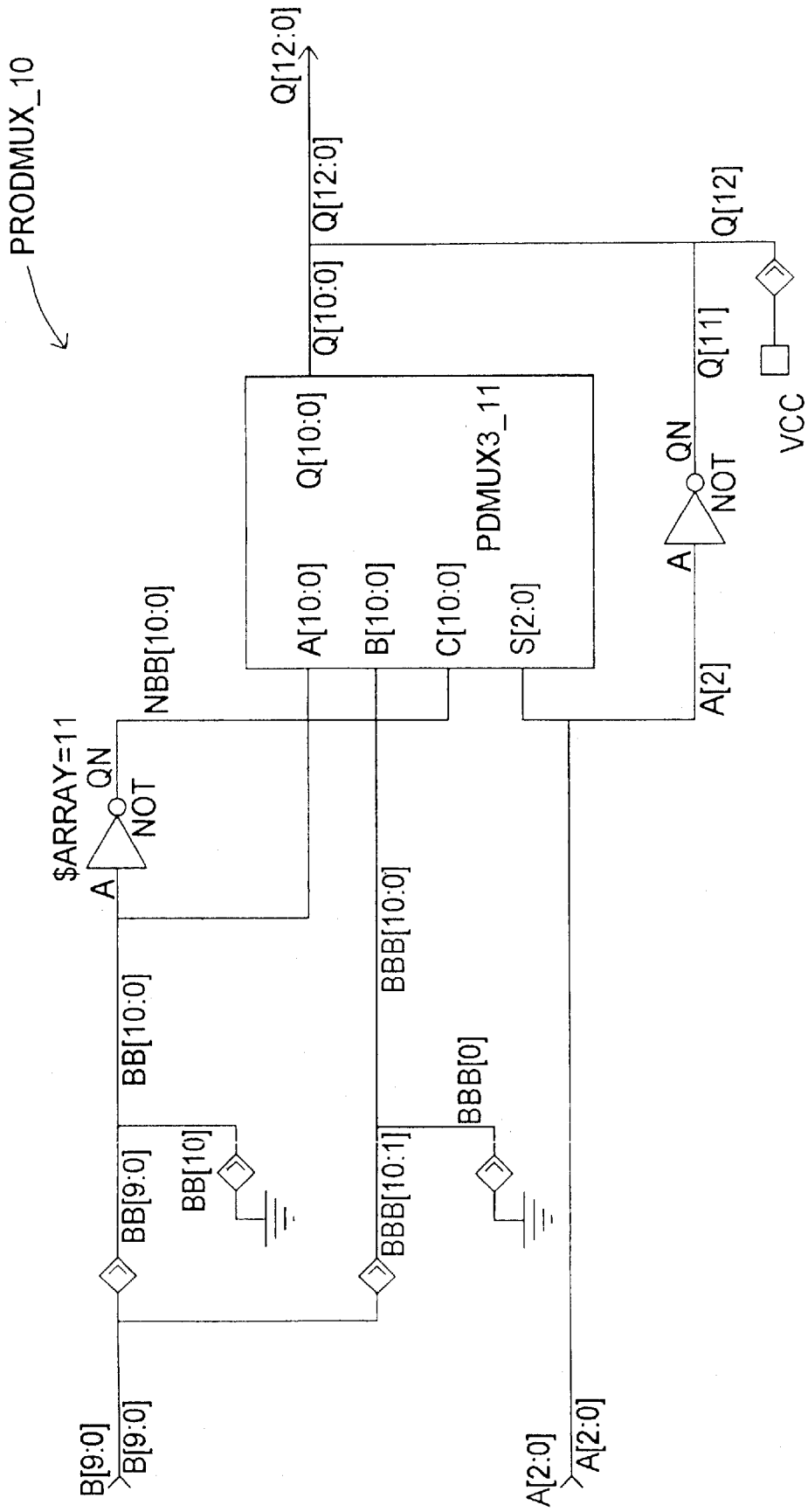
Figure 19:
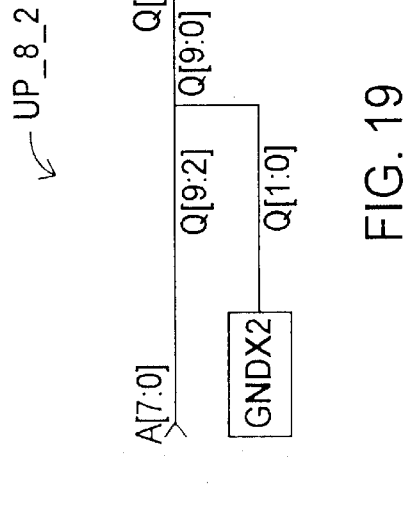
Figure 18:
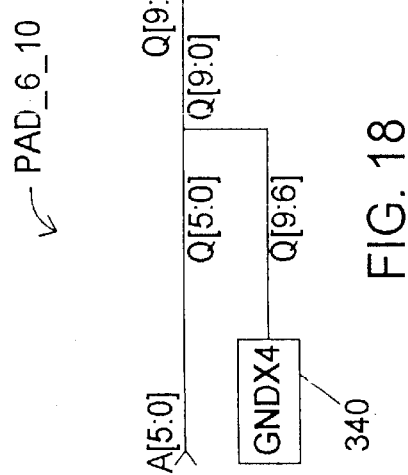
Figure 21:
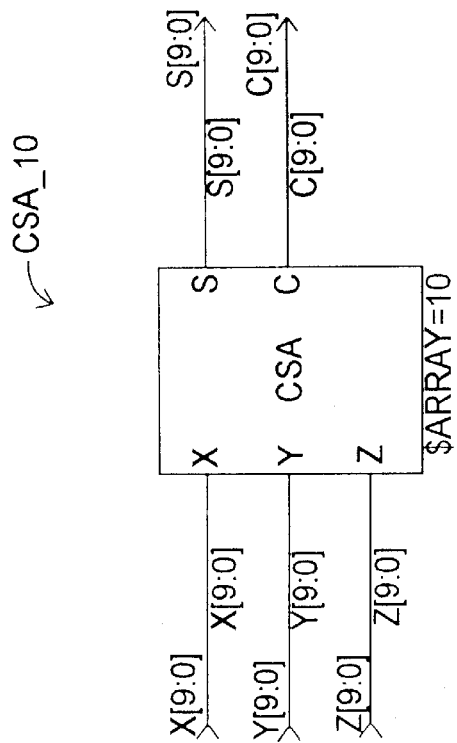
Figure 20:
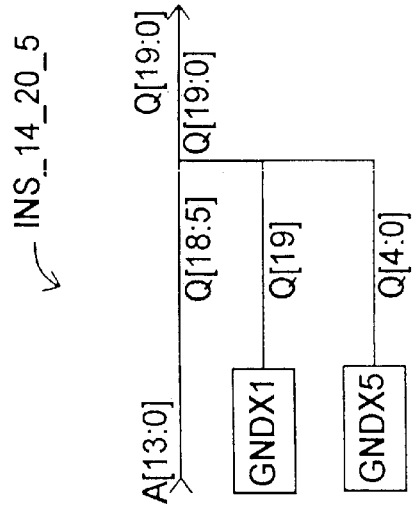
Figure 22:
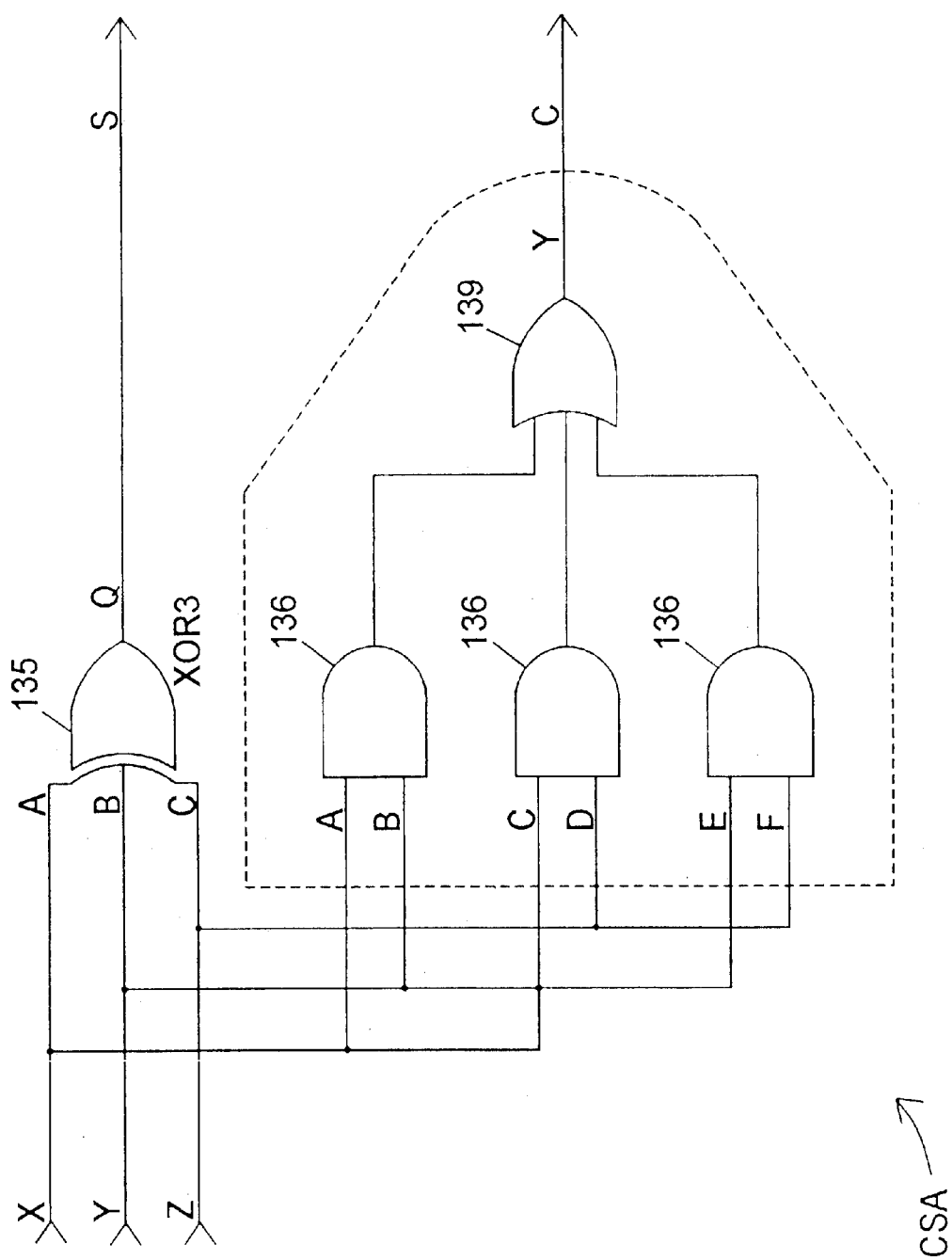
Figure 23:
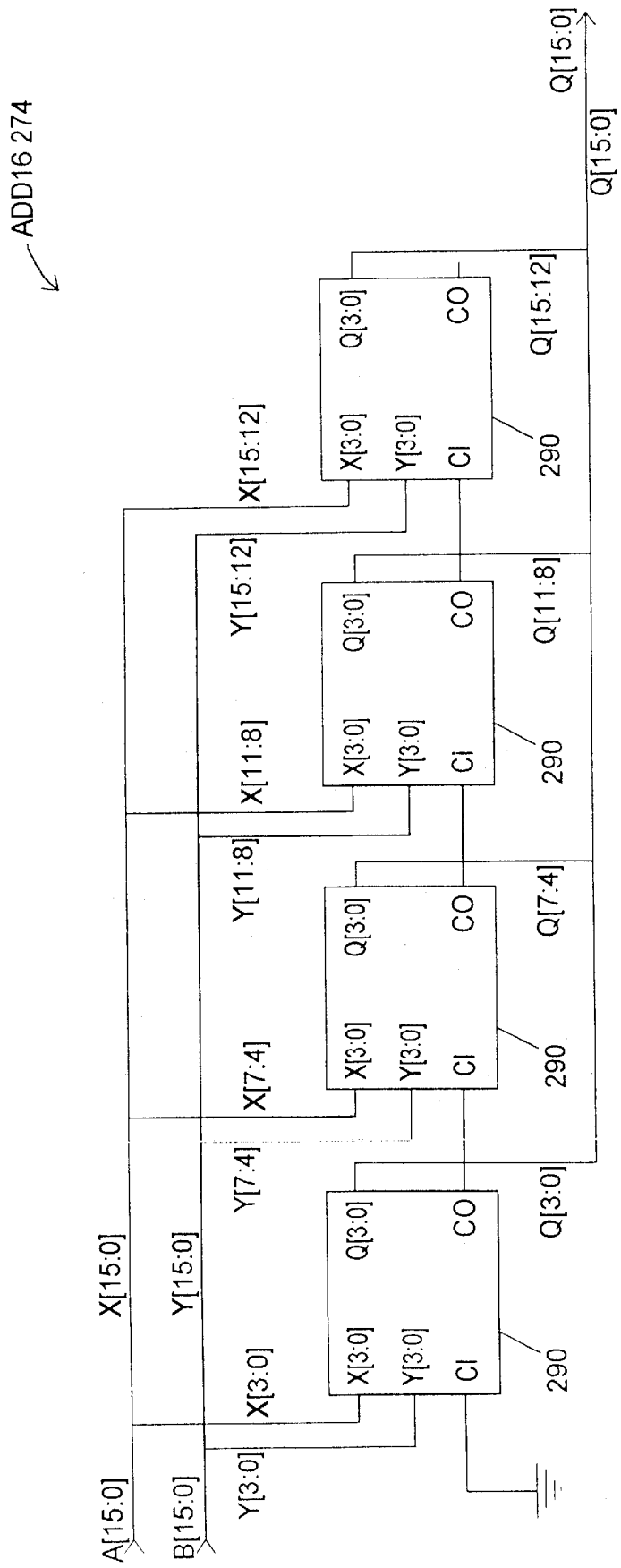
Figure 24:
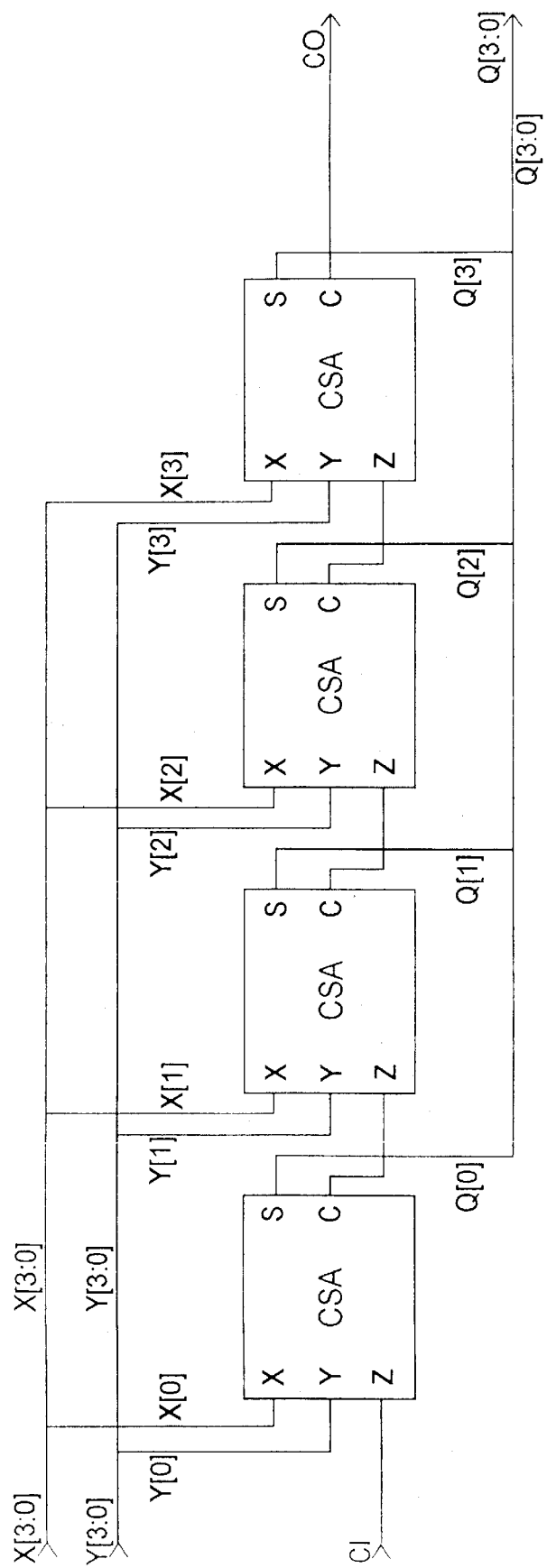

An implementation of Sbox_Mult 105 is shown in FIG. 14. Recode8 250 recodes the bits in 8-bit input A to facilitate efficient multiplication. An implementation of Recode 250 is shown in FIG. 15, comprising four Recode 300 blocks. An implementation of a Recode 300 block is shown in FIG. 16. ProdMux_9 251, 252, 253 and 254 computes the simple signed product of its 9-bit A input by 0, 1, 2 or −1 depending on whether its A input is 0, 1, 2 or 3, respectively, and produces an 11-bit output, Q, where Q[10] is set to 1 only if input A equals 3 and Q[11] is always set to 1. ProdMux_9 can be implemented in a similar manner to ProdMux_10 shown in FIG. 17. Elements 256, 257, 258, 259 and 260 are bus exchanges. Elements 261 and 262 are circuits of the general form Pad_N_M; each pads its input, which is of length N, with M–N grounds (0's) to produce an output of length M. An example of Pad_N_M, Pad_6_10, is shown in FIG. 18; it pads its 6-bit input with four 0's to produce a 10 bit output. Element Gndx4 340 in FIG. 18 is element of the general from GndxN, which returns N grounds (0's); in this case Gndx4 340 returns 4 grounds. Up_14_3 263 is a circuit of the general form Up_N_M; it receives an N bit input and pads it on the bottom with M 0's, producing a result that is N+M long. An example of Up_N_M, Up_8_2, is shown in FIG. 19. Elements 264, 265, 269, 271 and 272 are circuits of the general form Ins_N_M_L; each takes an N length input, pads it on the bottom with L grounds, inserts above as many bits of its input as fits in M outputs, and, if N+L<M, adds grounds (0's) at the top of the result. An example of Ins_N_M_L, Ins_14_20_5, is shown in FIG. 20. CSA_16 266, 270 and 273 and CSA_14 268 are circuits of the general form, CSA_N; each is an N-long array of carry-save (full) adders, CSAs. An example of a CSA_N circuit, CSA_10, is shown in FIG. 21, and an implementation of a constituent CSA circuit is shown in FIG. 22. As shown in FIG. 22, CSA computes the sum and carry bits, S and C, respectively, of its 3 inputs, X, Y, Z. XOR 135 sets sum S to 1 if (X ⊕ Y) ⊕ Z is 1, and 0 otherwise (i.e., it sets S to 1 if one of X, Y or Z is 1 or if all of them are 1). AND gates 136 and OR gate 139 sets carry C to 1 if at least two of X, Y and Z are 1, and zero otherwise. Finally, Add16 274, in FIG. 14, is a circuit of the general form AddN, which is an N-bit adder. An example of an AddN circuit, Add16, is shown in FIG. 23; it is comprised of four TrAdd4 290 circuits, which are examples of TrAddN circuits. TrAddN circuits are N-bit adders having a carry-in (CI) input and a carry-out (CO) output. An example of a TrAddN circuit, TrAdd4 290, is shown in FIG. 24.

Figure 13:
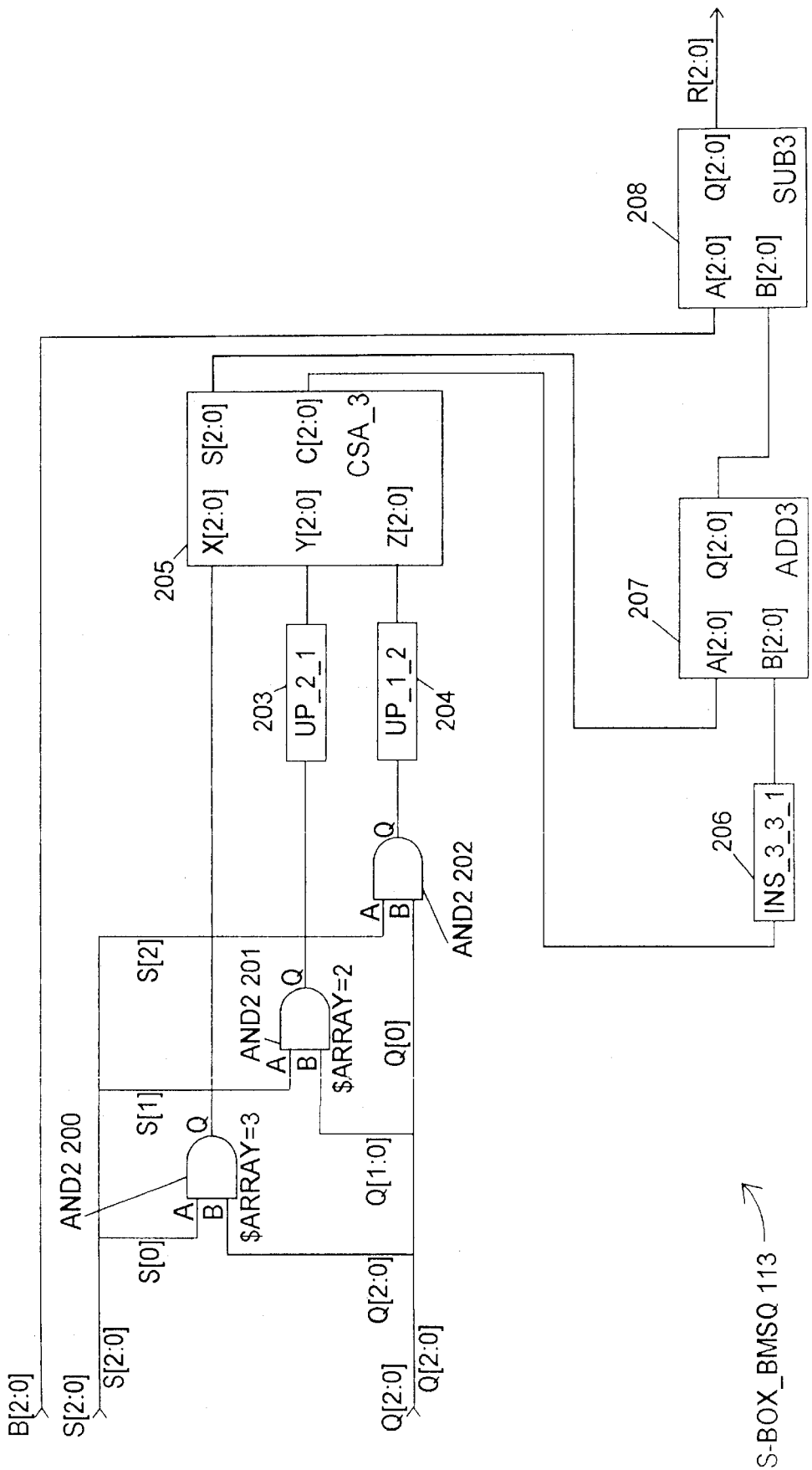
Figure 25:
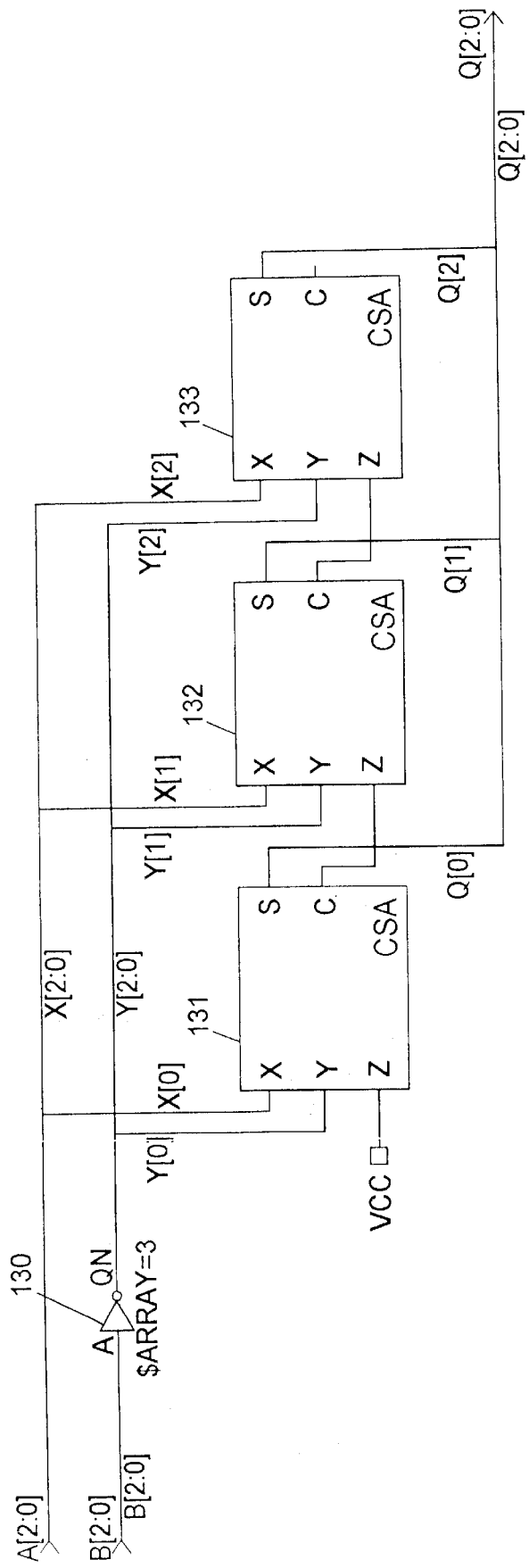

An implementation of Sbox_BMSQ 113 is shown in FIG. 13. AND gates 200, 201 and 202, Up_2_1 203 and Up_1_2 204, CSA_3 205, Ins_3_3_1 206 and Add3 207 compute S·Q, which is a output from Add3 207. Sub3 208 takes the output of Add3 207 and subtracts it from B (where B is the lower order three bits of $A_{top}$). The circuitry in Up_2_1 203 and Up_1_2 204, CSA_3 205, Ins_3_3_1 206 and Add3 207 is described above. Sub3 208 is a circuit of the general form SubN, which subtracts N-bit inputs producing an N-bit output. An example of a SubN circuit, Sub3 208, is shown in FIG. 25;

FIG. 25 shows a circuit that subtracts 3-bit input B from 3-bit input A and outputs 3-bit result Q. NOT gate 130 outputs the complement of B, designated Y. The input A is designated X. CSA 131, 132 and 133 are carry-save (full) adders, each of which outputs a result bit on its S output and a carry bit on its C output. CSA 131 computes the low order bit of the result, Q[0], CSA 132 computes the middle bit of the result, Q[1], and CSA 133 computes the high order bit of the result, Q[2]. Specifically, CSA 131 sums X[0], Y[0] and hardwired 1(i.e., VCC) and outputs the first bit of the result, Q[0], on its S output and carry value on its C output. CSA 132 receives and sums X[1], Y[1] and the C output from CSA 131 and outputs the second bit of the result Q[1] on its S output and carry value on its C output. CSA 133 receives and sums X[2], Y[2] and the C output from CSA 133 and outputs the third bit of the result Q[2] on its S output.

Figures 26, 27:
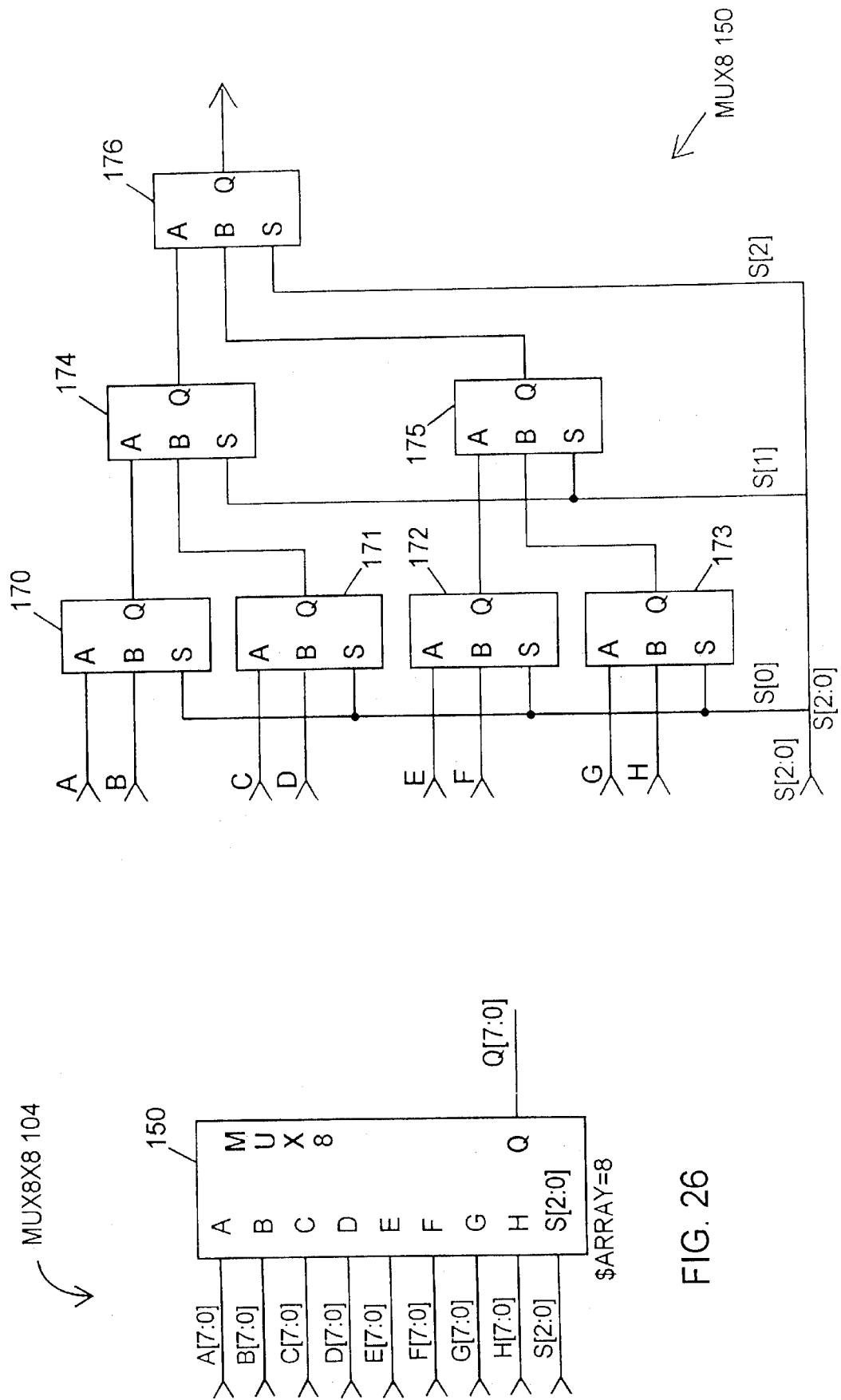
Figure 28:
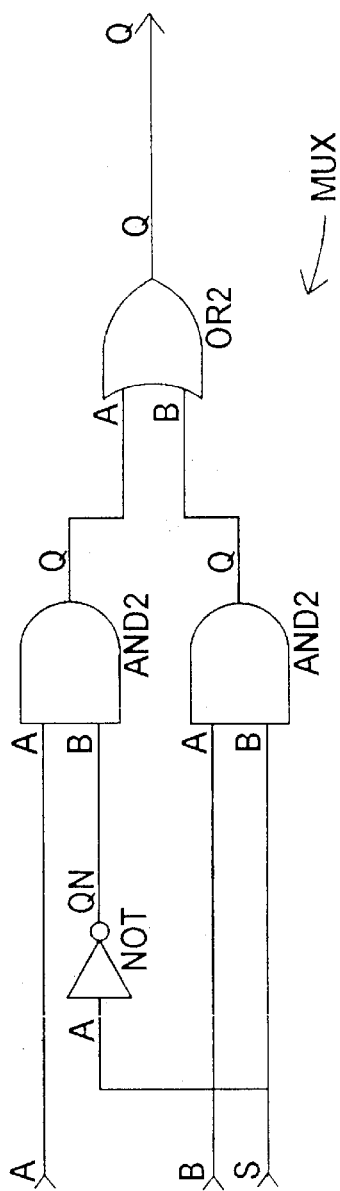

An implementation of MUX8x8 104 in FIG. 12 is shown in FIGS. 26–28. As depicted in FIG. 26, multiplexer 104 is a hardware array of 8 MUX8 150 units, one unit for each bit of the 8 bit input values A–H. A MUX8 150 unit is depicted in FIG. 27 and comprises 7 MUX units 170–176. Each MUX unit selects and outputs one of its input, A or B, based on its S input. MUX units 170–173 select outputs based on the lower order bit of S (i.e., S[0]); MUX units 174–175 select outputs based on S[2]; and MUX unit 176 selects an output based on S[3]. An implementation of a MUX unit is shown in FIG. 28 and its operation is readily apparent to one skilled in the art.

Figure 29:
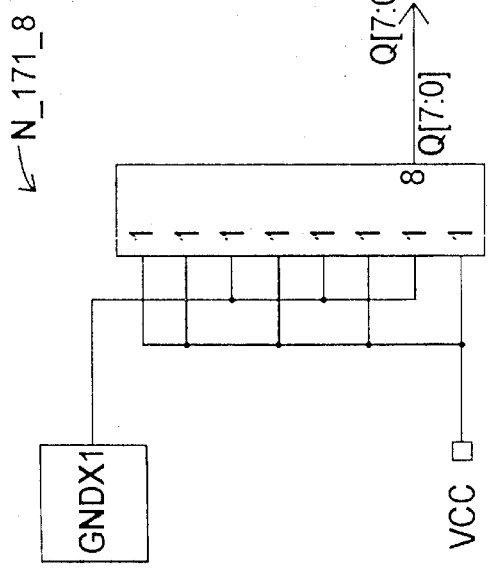

Constant bank 102 and N_1_3 114 in FIG. 12 are hardwired constants of the general form N_K_M, where K is the value of the constant and M is the number of bits of the output. An example of N_K_M, N_171_8, is shown in FIG. 29. It outputs the value 171 (binary 10101011) on an 8 bit bus.

Figure 30:
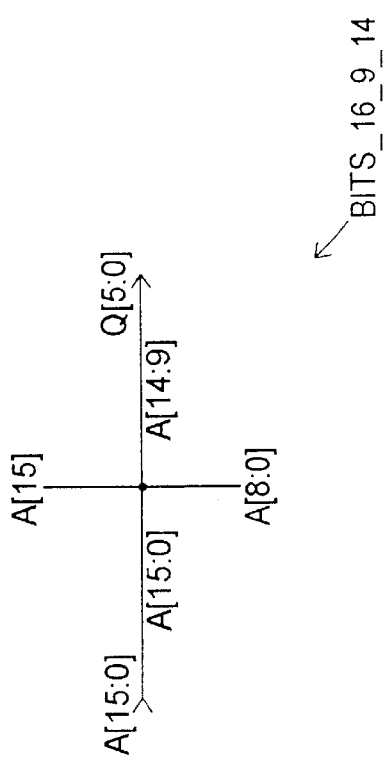

Elements 106, 107 and 108 in FIG. 12 are sub-bus junctions of the general form Bits_N_K_L; the junction takes in an N-bit bus A[N-1:0] and outputs the sub-bus A[L:K]. An example of Bits_N_K_L, Bits_16_9_14, is shown in FIG. 30. It outputs bits 9–14 of a 16 bit input bus.

Figure 31:
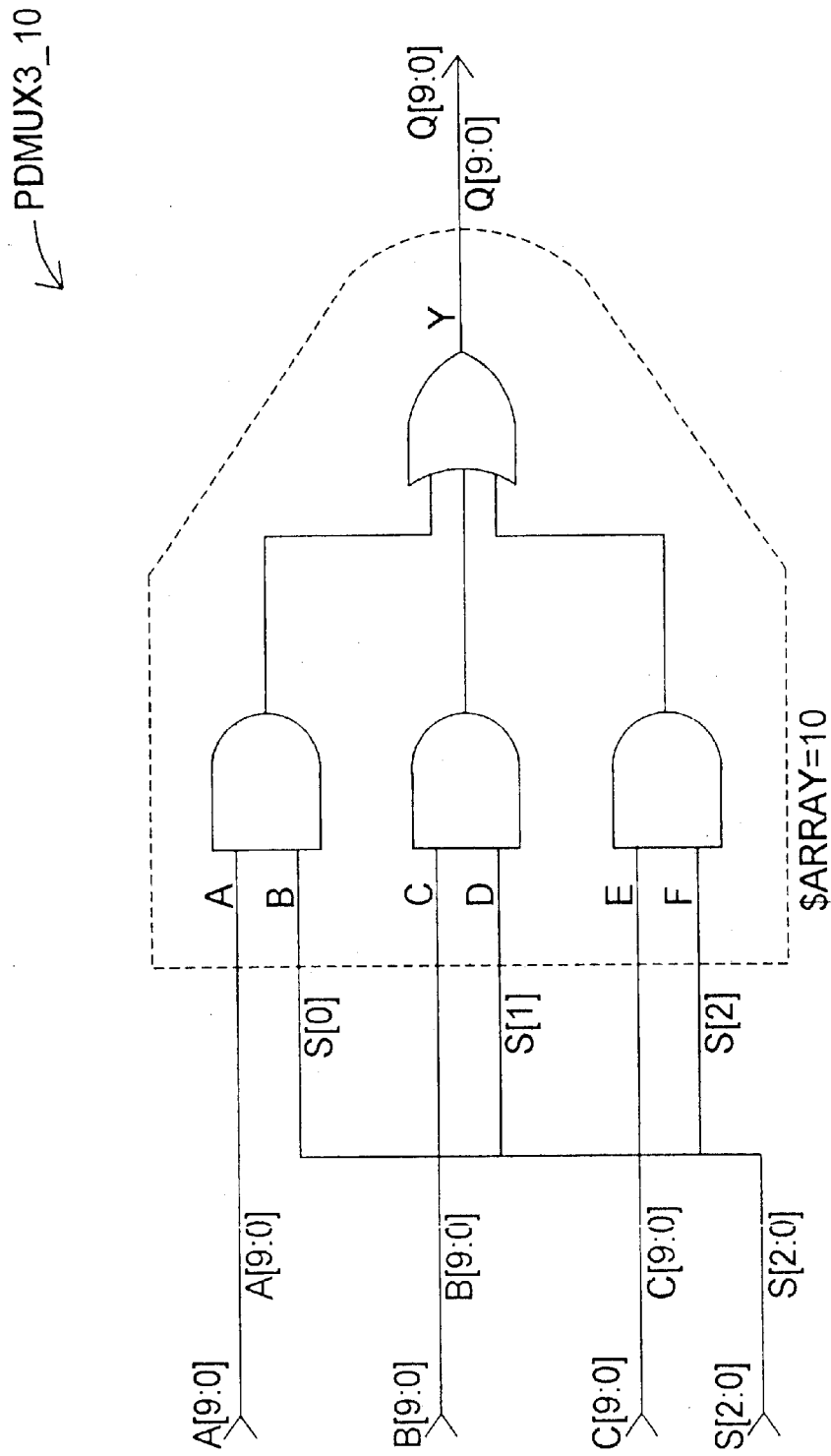

PDMux3_6 109 in FIG. 12 is a predecoded multiplexer of the general form PDMuxN_M; such multiplexers receive N individual select lines and output one of N vector buses of width M. An example of PDMuxN_M, PDMux3_10, is shown in FIG. 31. It has three select lines S that select one of three 10-bit wide inputs, A, B, C, and outputs the selected input.

Figure 36:
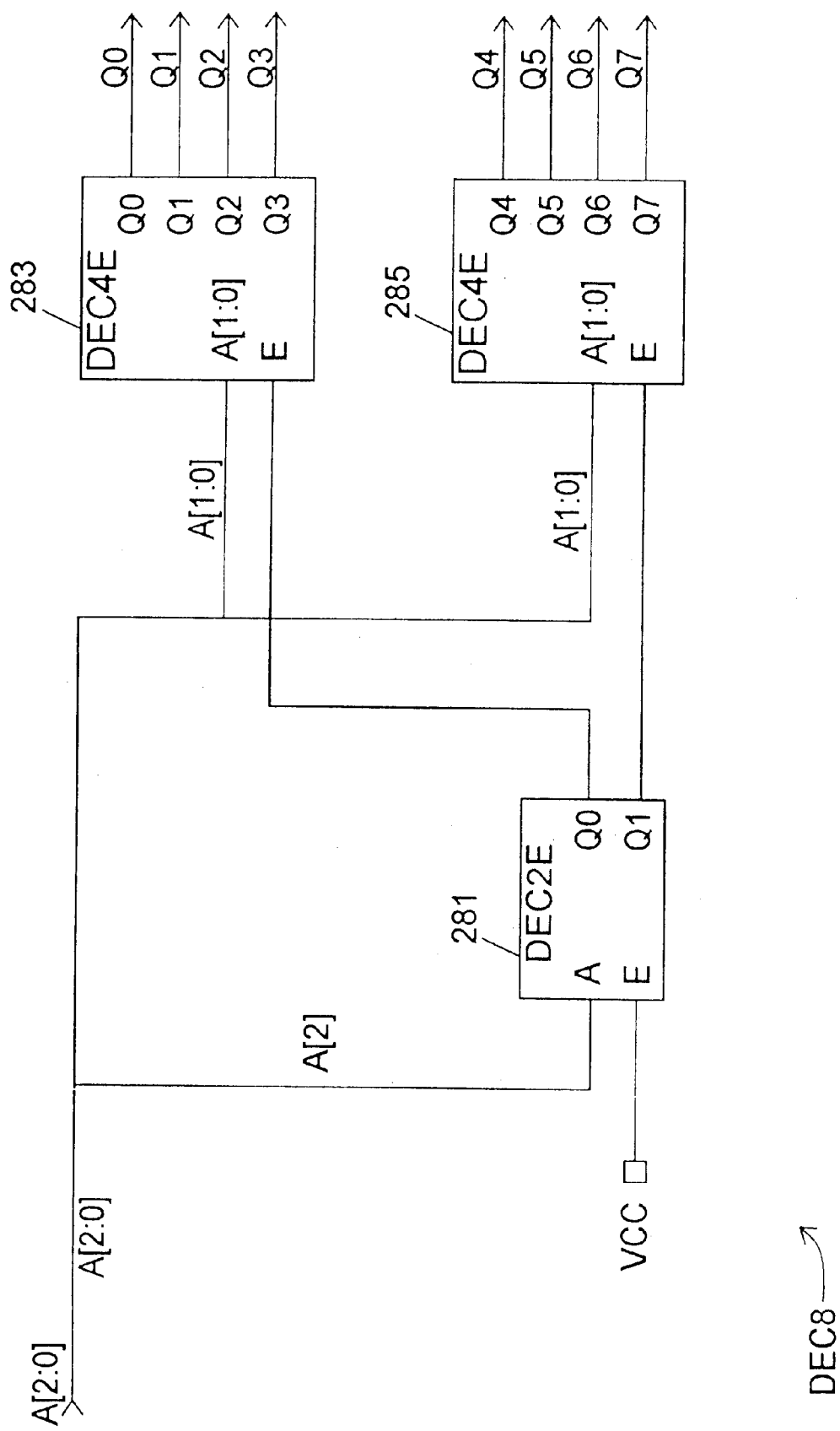
Figure 37:
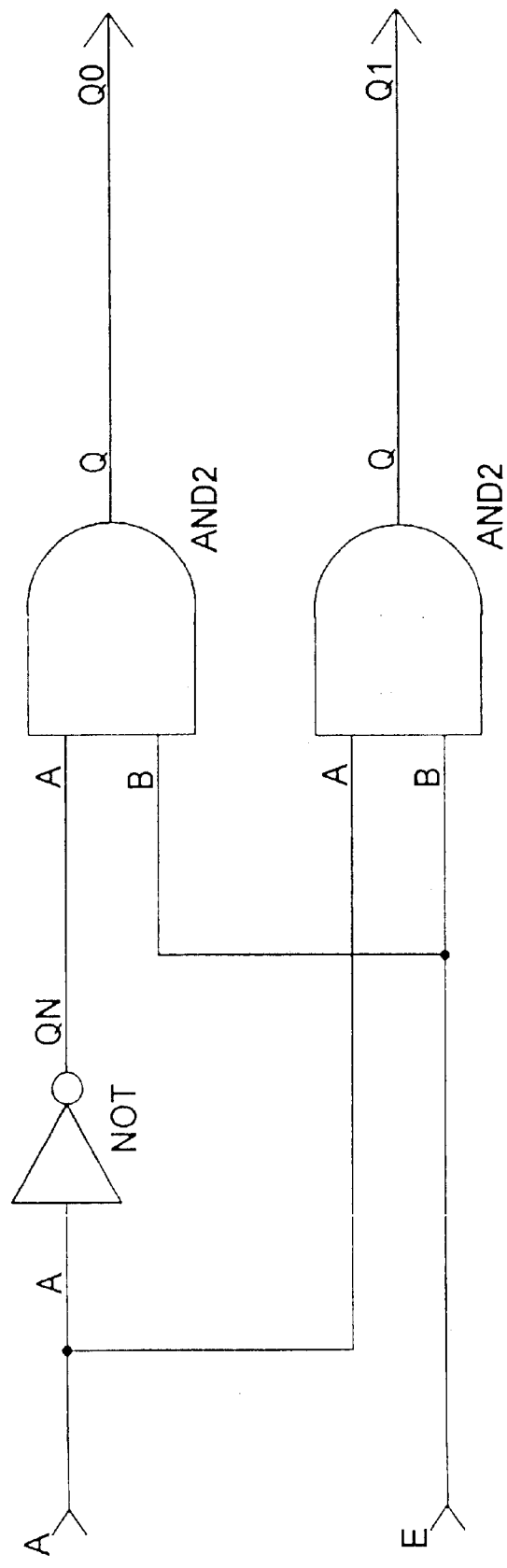

An implementation of decoder DEC8 110 is shown in FIG. 36. DEC8 110 sets one of its outputs, Q0–Q7, high based on the value received on its 3-bit input A. It is comprised of DEC2E 281 and DEC4E 283 and 285, which are examples of circuits of the general form DECNE; each takes an input that is $\log_2 N$ wide and sets one of its N outputs high if its enable input E is also high. An example of DECNE, DEC2E, is shown in FIG. 37.

Figure 32A:
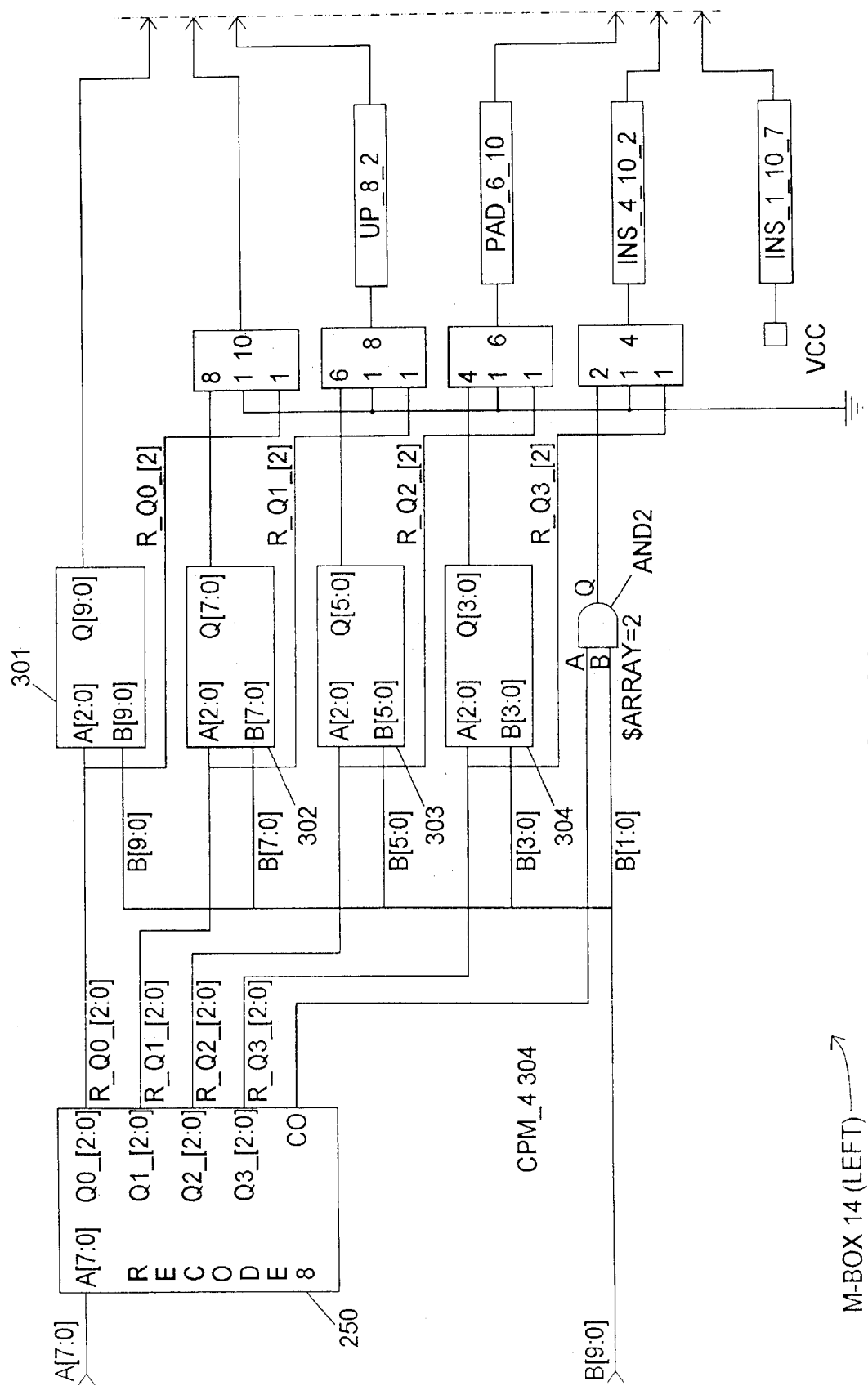
Figure 32B:
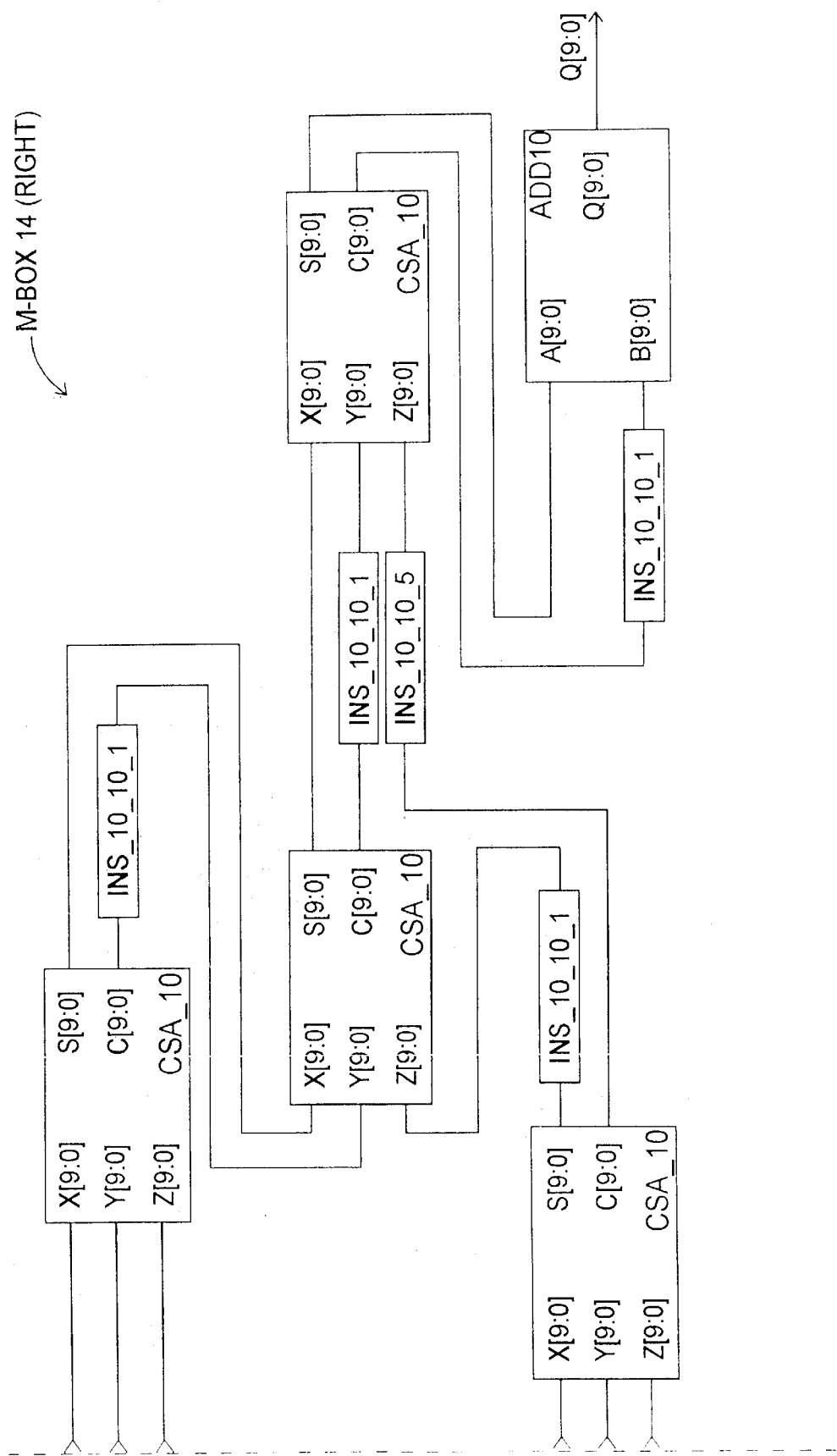
Figure 33:
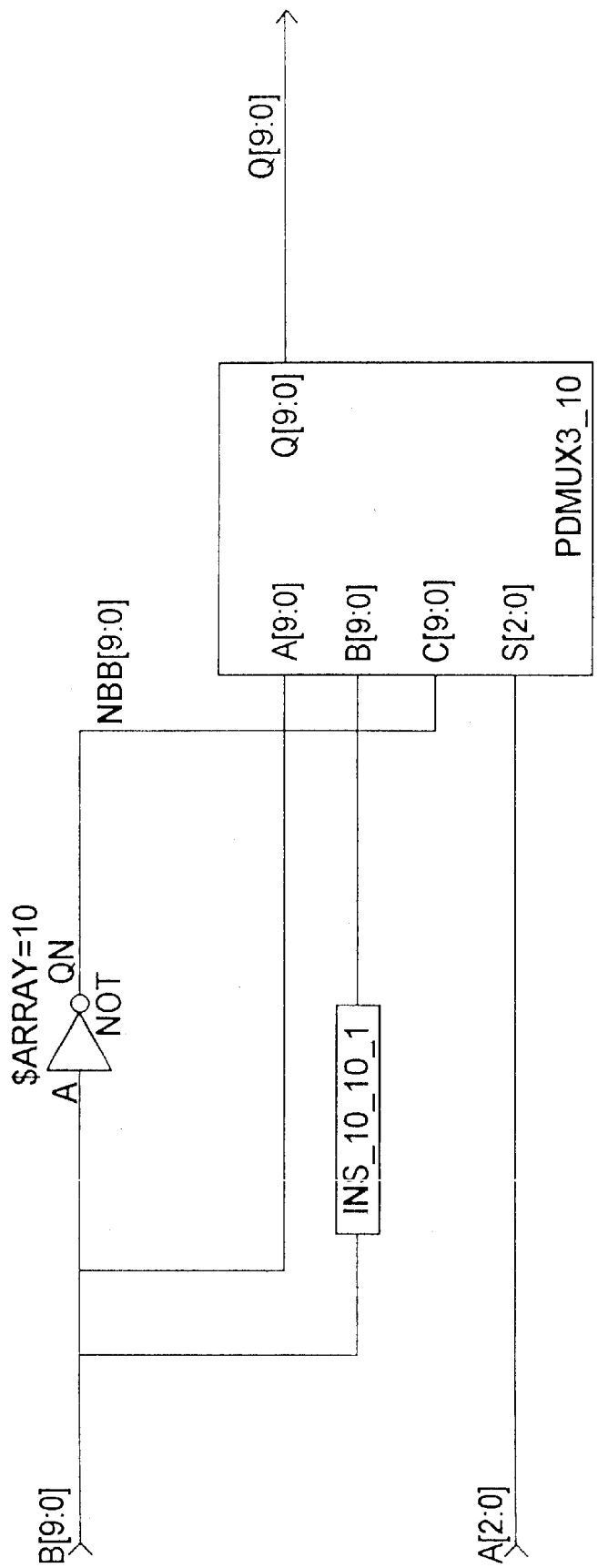

FIG. 32 depicts a hardware implementation of M-Box 14. It receives the 8-bit value Λ on its A input and the lower 10 bits of address A (i.e., A[9:0], or $A_{Bot}$) on its B input, computes $A_{bot} \cdot \Lambda \bmod 2^{10}$, and outputs the 10 bit result. All the components of FIG. 32 have been discussed above, except CPM_10 301, CPM_8 302, CPM_6 303 and CPM_4 304, each of which are chopped product multiplexers of the form CPM_N. A CPM_N multiplexer receives an N bit input, B[N-1:0] and outputs B[N-1:0] (i.e., 1·B), B[N-1:0] left-shifted one bit (i.e., 2·B), or the complement of B[N-1:0] (i.e., -1·B), depending on which select line from input A[2:0] is logic 1. An example of CPM_N, CPM_N, CPM_10 301, is shown in FIG. 33. In this example, input is 10 bits wide.

Figure 34:
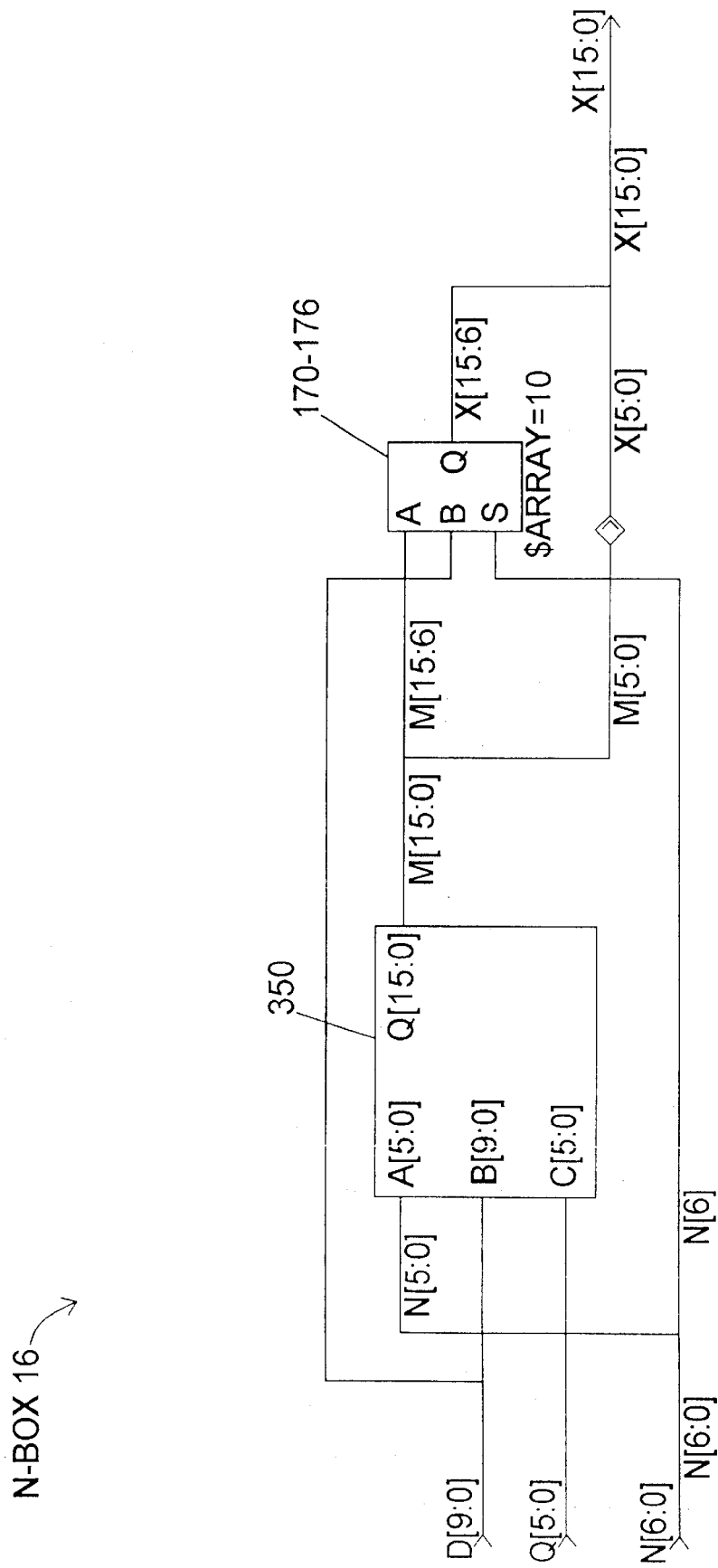

FIG. 34 depicts a hardware implementation of N-Box 16. It receives the output of M-Box 14 on its D input, the Q output of S-Box 12 on its Q input and the number of banks, N, on its N input. The D, Q and N inputs are sent to the B, C and A inputs, respectively, of Nbox_Mult 350, which computes D·N+Q and outputs the 16-bit results. There is also a special provision for the case of N=64 when there are no defective banks.

Figure 35A:
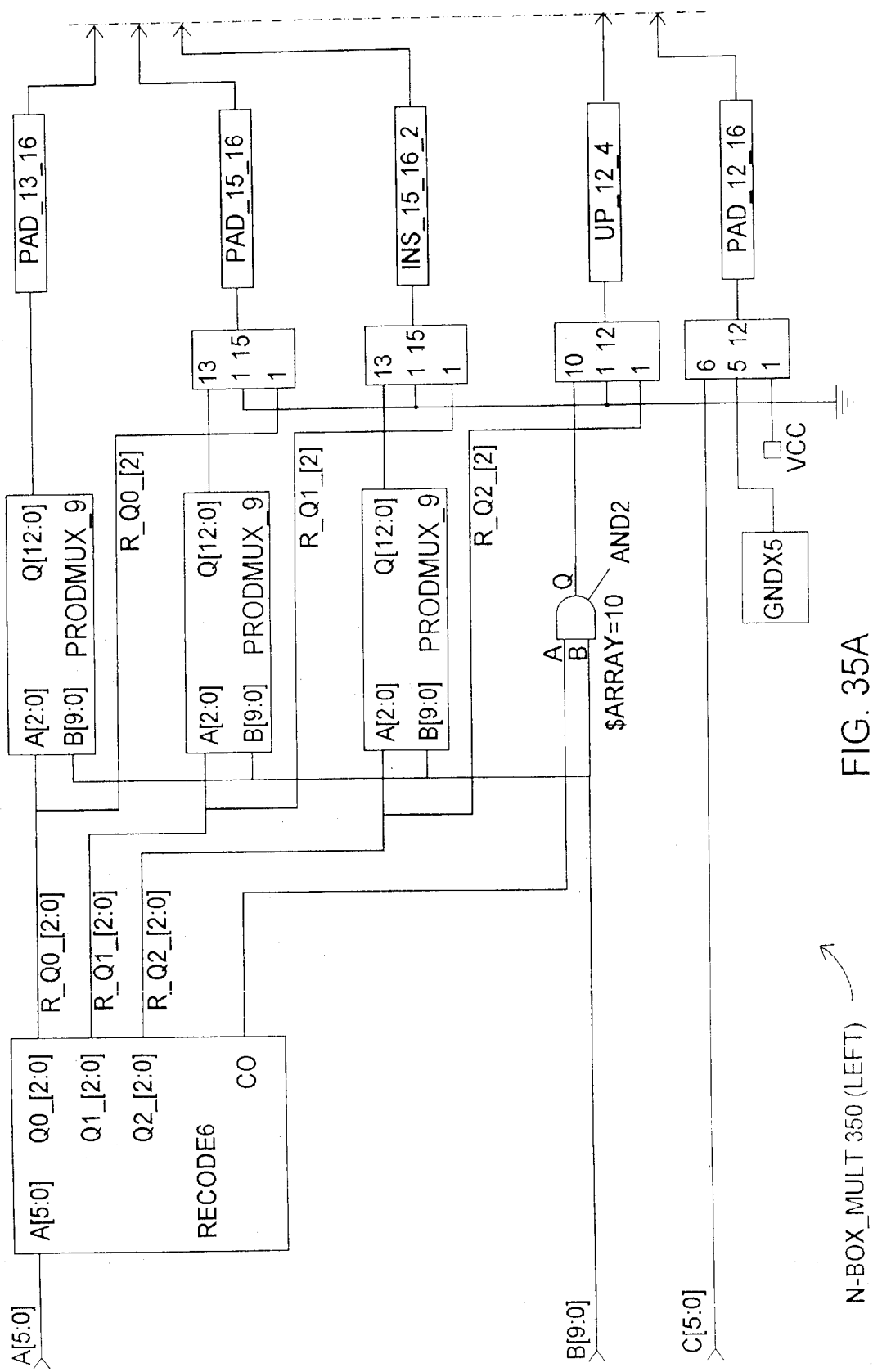
Figure 35B:
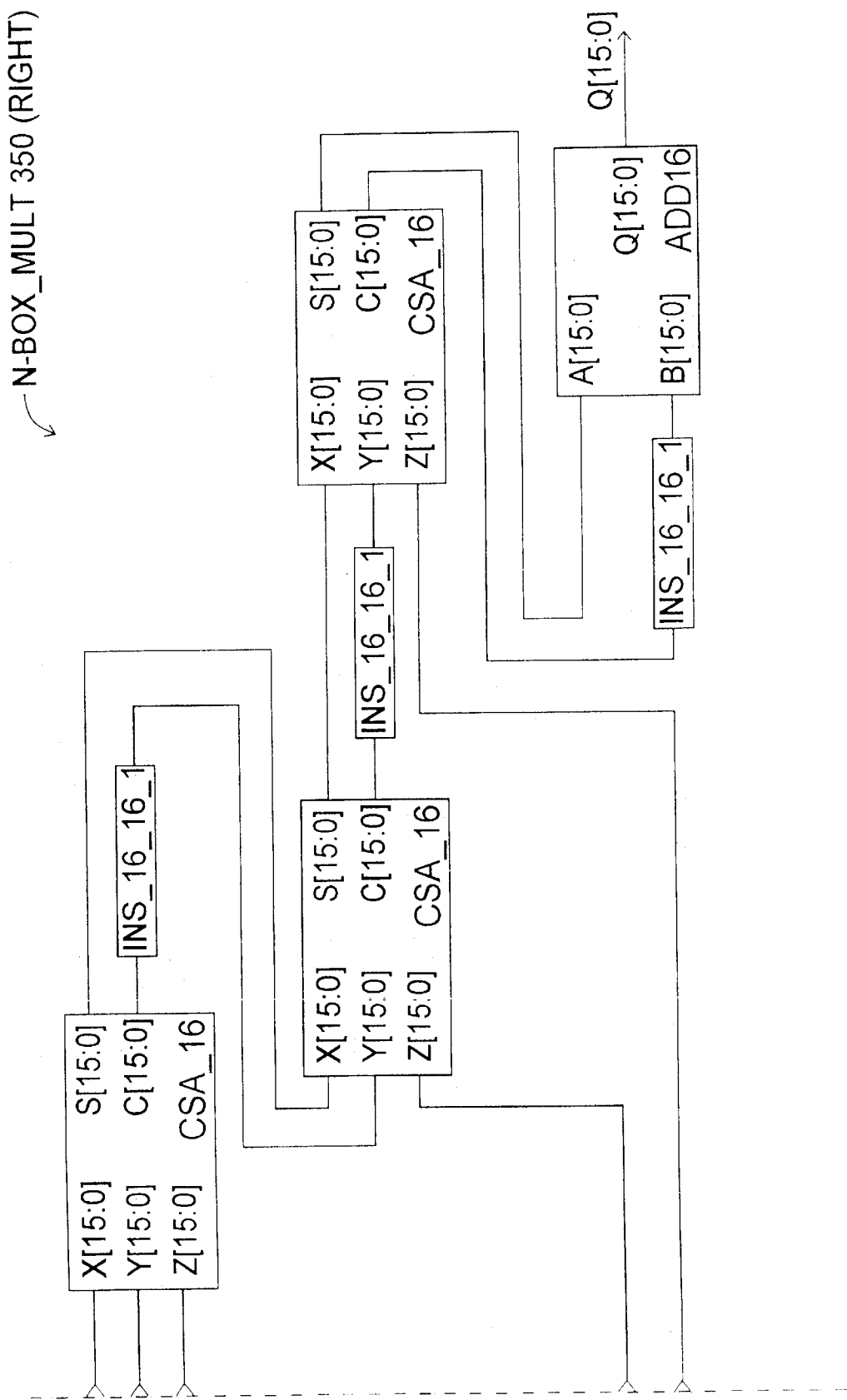

A hardware implementation of Nbox_Mult 350 is shown in FIG. 35. All the components of FIG. 35 have been described above.

A preferred hardware implementation has a single-cycle operation, typical for conventional systems. In systems where the memory subsystem can tolerate wait states by, for example, preparing new outstanding requests while previous ones are being serviced, pipelined operation of "S-, M-, N-Boxes" is advantageous—it permits significantly shorter cycle time at the cost of adding several short registers for keeping intermediate results. Another possibility is to use an asynchronous implementation of all short muliplications in the S-, M-, N-Boxes described above. For asynchronous accesses to memory arrays, this approach removes setup/hold constraints and provides the fastest time for most data patterns. Depending on the implementation of the asynchronous multiplier arrays, this approach can result in a data-dependent timing.

D. Alternative Embodiments

There is a wide choice of various implementations of the present system of address translation, based on modular multiplications as a means of creating a quasi-crystal mapping. They vary in complexity of the implementations, and in performance for different numbers of banks and different explicit patterns of memory access. Among these the preferred embodiment has the minimal complexity hardware implementation for an arbitrary number of banks.

One low complexity technique for deriving bank number u and local address la from the scrambled address A (where A=Λa mod $2^K$) is to set u=(A·N)/$2^K$ and la=A−u·$2^K$/N, where N is the number of banks, when the number S of sub-banks per bank is 1 (S=1). Here N is a short constant, and $2^K$/N is a (longer) constant for a fixed number N. Thus, in addition to the standard scrambling, this approach requires only 2 multiplications by short (e.g., 6-bit) numbers and addition/subtraction. Furthermore, various modular multiplications (scrambling and translation) can be merged into one block to speed up the whole process, resulting in a process that can potentially be completed in time Ts.

Figure 11:
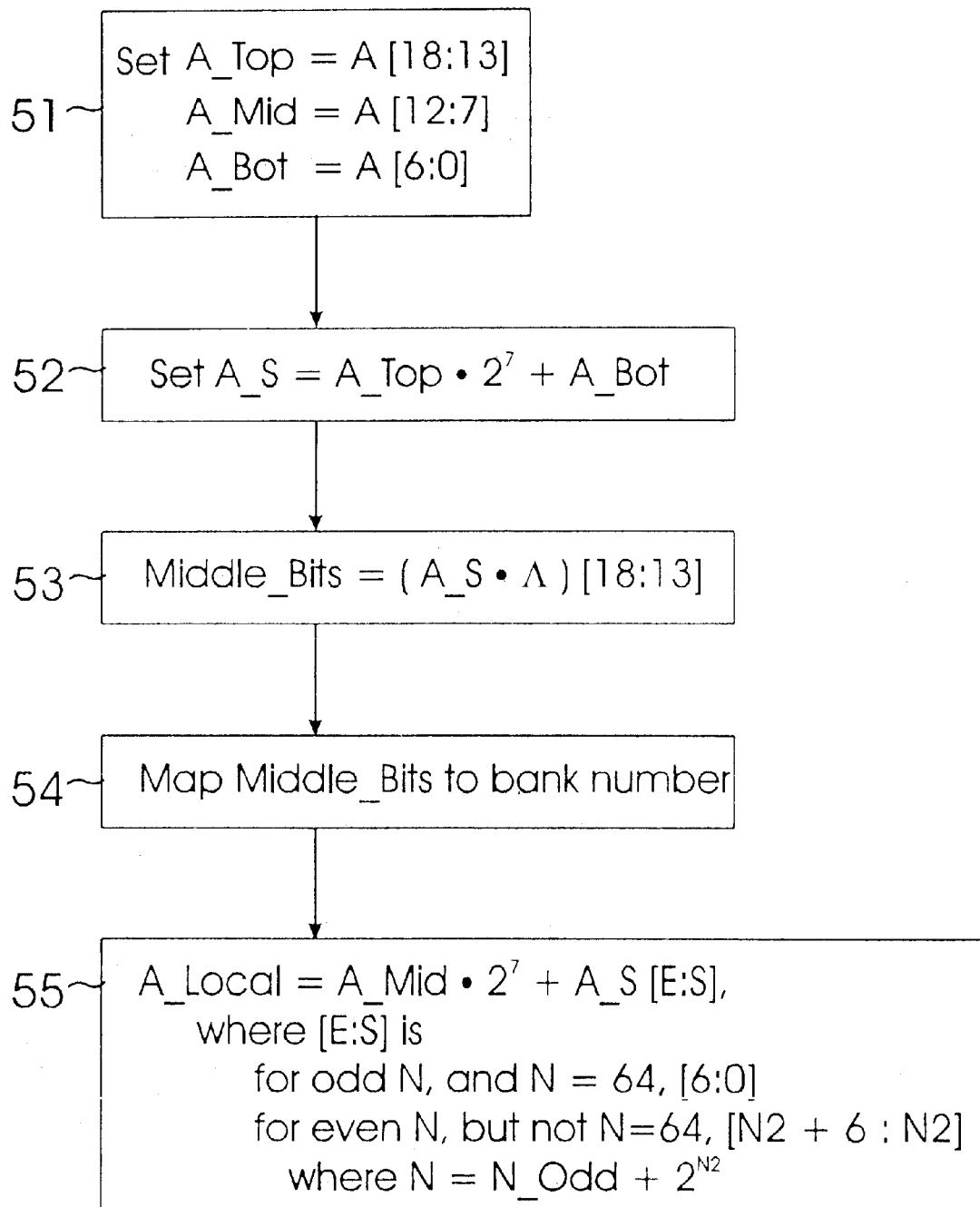
FIG. 11 is a flowchart illustrating an alternative embodiment of the present invention.

FIG. 11 illustrates an alternative embodiment of a translation unit in accordance with the present invention. Here, as above, the number of banks, N, does not exceed 64. As in the previous embodiment, the translation unit receives an address A and generates a corresponding bank number and local address. In step 51, A__Top is set to A[18:13], A__Mid is set to A[12:7] and A__Bot is set to A[6:0]. In step 52, A__S is set to A__Top·$2^7$+A__Bot. Steps 51 and 52 select 12 bits from A for the purpose of determining a bank number. Bits other than the ones specified in these steps may also be used. In step 53, Middle__Bits is set to (A__S·Λ)[18:19]. In step 54, Middle__Bits is mapped to a bank number via a non-defective bank table, or similar translation mechanism. Finally, in step 55, the local address, A__Local, is set to A__Mid·$2^7$+A__S[E:S], where [E:S] is: for odd N and N=64, [6:0]; and for even N, but not N=64, [N2+6: N2] where N=N__Odd*$2^{N2}$ (i.e., N__Odd is the odd factor of N and N2 is the largest power of 2 dividing N).

There are further embodiments in accordance with the present invention and using modular multiplication to create quasi-crystal mappings for minimization of bank conflicts for various explicit memory patterns of accesses. In yet another such embodiment, A is first multiplied by a 19-bit constant LL, looking at bits [36:18] of the product A·LL. In a different example of such embodiment the following modular multiplication (transformation) method is used:

$$A \rightarrow A \cdot 4161 + 127$$

with product bits [17:14] and [19:18] providing the valid bank number, while the higher bits of the product provide the local address.

The embodiments shown immediately above use more gates, and are potentially slower than, the embodiments shown in FIGS. 1–4. In some cases (e.g., for N=61) they are better for fixed stride accesses, while for others (e.g., N=63) they are somewhat worse.

One skilled in the art would appreciate that various combinatorial circuits, including adders (e.g., implementations of polynomial multiplications over finite or infinite fields, etc.), table-lookups, and variations to modular multiplication, or even analog solutions, rather than modular multiplications, can be used to construct the finite quasi-crystal mappings for use in the address translation unit with the same effect of minimizing memory banks conflicts in explicit patterns of access of the multi-bank memories (including, but not limited to, patterns of fixed stride and/or linear patterns of access in multidimensional tables).

E. Fault-Tolerant Operations

The remapping and scrambling system described above enables fault tolerant operation of the whole memory system and fault tolerant operation of multi-processor and multi-bank systems on-a-chip.

The prerequisite to any fault-tolerant operation is the memory testing that determines the failures of individual memory banks or modules, and/or processing units controlling these banks or modules (units). This testing can happen at any stage of memory and/or processor use—at the initial testing after the manufacturing of the component, or at any time during the life and operation of the component. This testing can be external (for example, by means of exercising memory accesses through an external memory bus), or internal, using various state of the art approaches, such as a serial or parallel scan path or paths, BIST (built-in-self-test), or special on-the-chip circuitry that generates test patterns for comprehensive testing.

Once testing is performed and defective elements—memory blocks, banks, or processing units—are found, detect information must be stored, so it can be efficiently used by the remapping circuitry. There are many natural ways to store this information. First, the defect information can be hardwired into the chip if testing is done at the time of manufacture—however, no further changes will generally be possible. Second, it can be written, or downloaded, into a special RAM area or areas of the chip after the testing. This requires separate storage of the bad element numbers. Such storage can be done externally in a PROM or other machine-readable form (bar-code, magnetic code, system storage, etc.). Third, a special non-volatile area of the chip can be dedicated for such storage and then accessed or reprogrammed after further testing. Fourth, in many cases, both the testing and reprogramming can be done entirely in software, when, for example, following boot procedures the software tests the memory and downloads the list of bad elements into RAM (or even register) areas of the chip. The non-defective bank table 6, described above in connection with FIGS. 1 and 2, is especially suited for the third and fourth techniques. Those skilled in the art will appreciate that other techniques for storage defect information may also be used and the present invention is not limited to the specific techniques described above.

The information about the defective elements (e.g., memory banks, units or processing units) can take many forms. For example, if only a few defective elements are expected, the defective element numbers can be stored, with the remapping ensuring that these element numbers are not used. In the case where the number of defective elements may be large, a simple RAM storing a list of good (non-defective) elements can be used. As a typical case of this implementation, consider a 64 memory bank (unit) system, where any number of banks can be labeled defective and only N are good (non-defective). Non-defective bank table 6 in FIG. 1 is an example of such a RAM. As described above, it comprises a 64×6 RAM (or ROM) array that stores for each valid 6-bit bank number Bank (1≦Bank≦N), the actual number of one of teh N non-defective banks on the chip. This array provides on the output of the "Bank" bus the (binary) value of the non-defective memory bank.

Alternatively, the list of defective or non-defective banks can be compressed using various compression techniques for a RAM array that significantly reduce the number of bits required to store the defect information. For example, the number can be reduced from 64×6 bits (i.e., the maximal number of bits needed without compression is almost all banks are defective) to at most W×6 bits where W is the smallest of the number of defective or non-defective banks. This compression, though, comes at a cost of additional decompression circuitry (of about O(W) gates), and an additional time delay to translate the bank number. It might be useful only in cases when small RAM (ROM) blocks cannot be efficiently used on the chip, and the storage array is implemented instead using registers.

The values of other parameters may also need to be adjusted in order to provide fault-tolerant operations, such as the values of N and S—i.e., the number of memory banks and sub-banks (units), respectively, the constants L, and multipliers Λ or LL. The values of N, S, L and/or Λ can be stored or downloaded together with the list of non-defective units. They should be kept in fast registers with buffered output signals, or hardwired directly (if testing and modification is done at manufacturing time). The values of constants L, Λ, or LL, can be downloaded, or fixed values for L, Λ, or LL, can be simply hardwired. Hardwiring L, Λ, or LL, decreases performance if a significant number of blocks are defective (above 50%), but also significantly reduces the number of gates in S-Box 12 and in M-Box 14 in FIG. 3.

Figure 7:
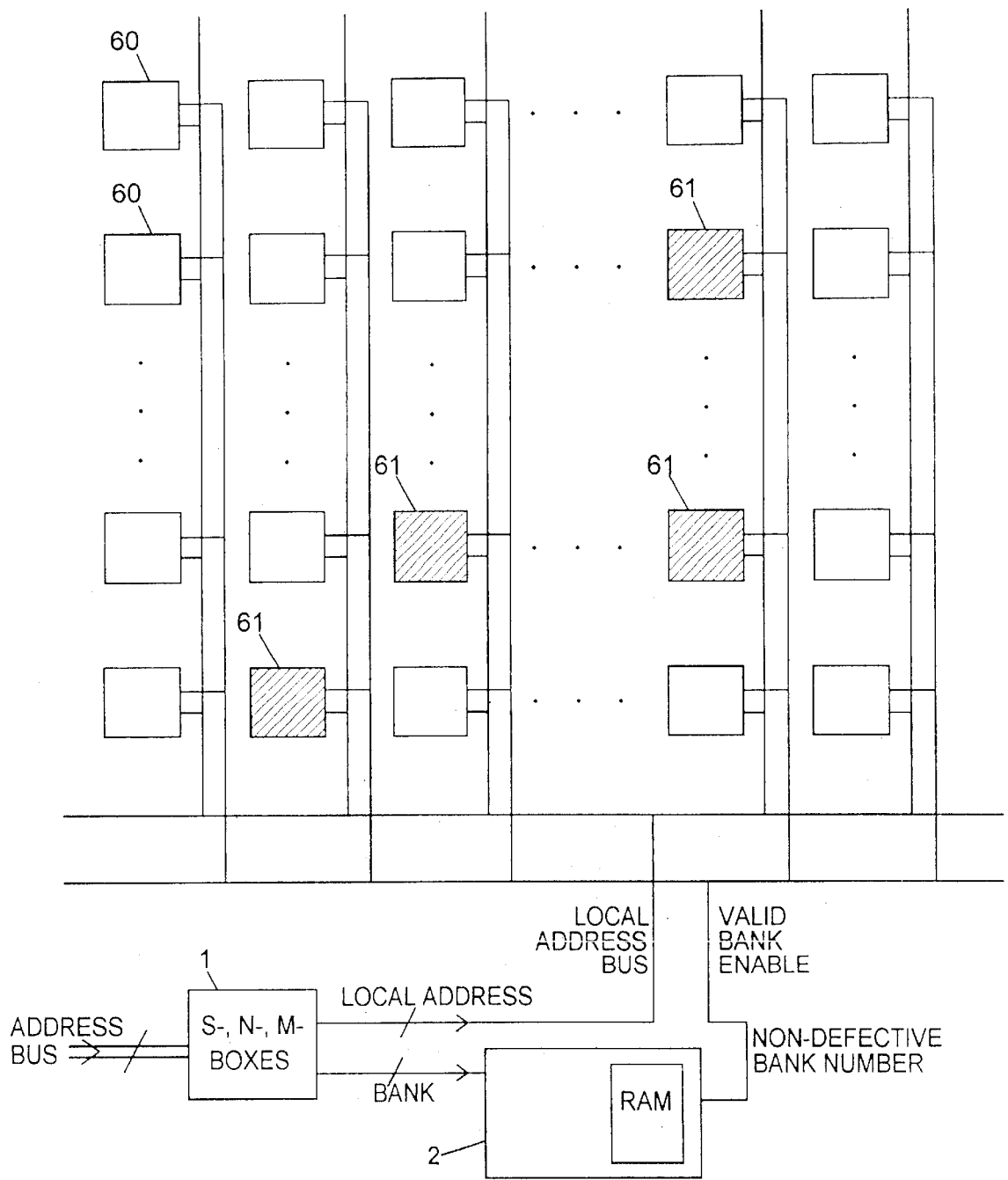
FIG. 7 illustrates an embodiment of the present invention connected to a single memory array.
Figure 8:
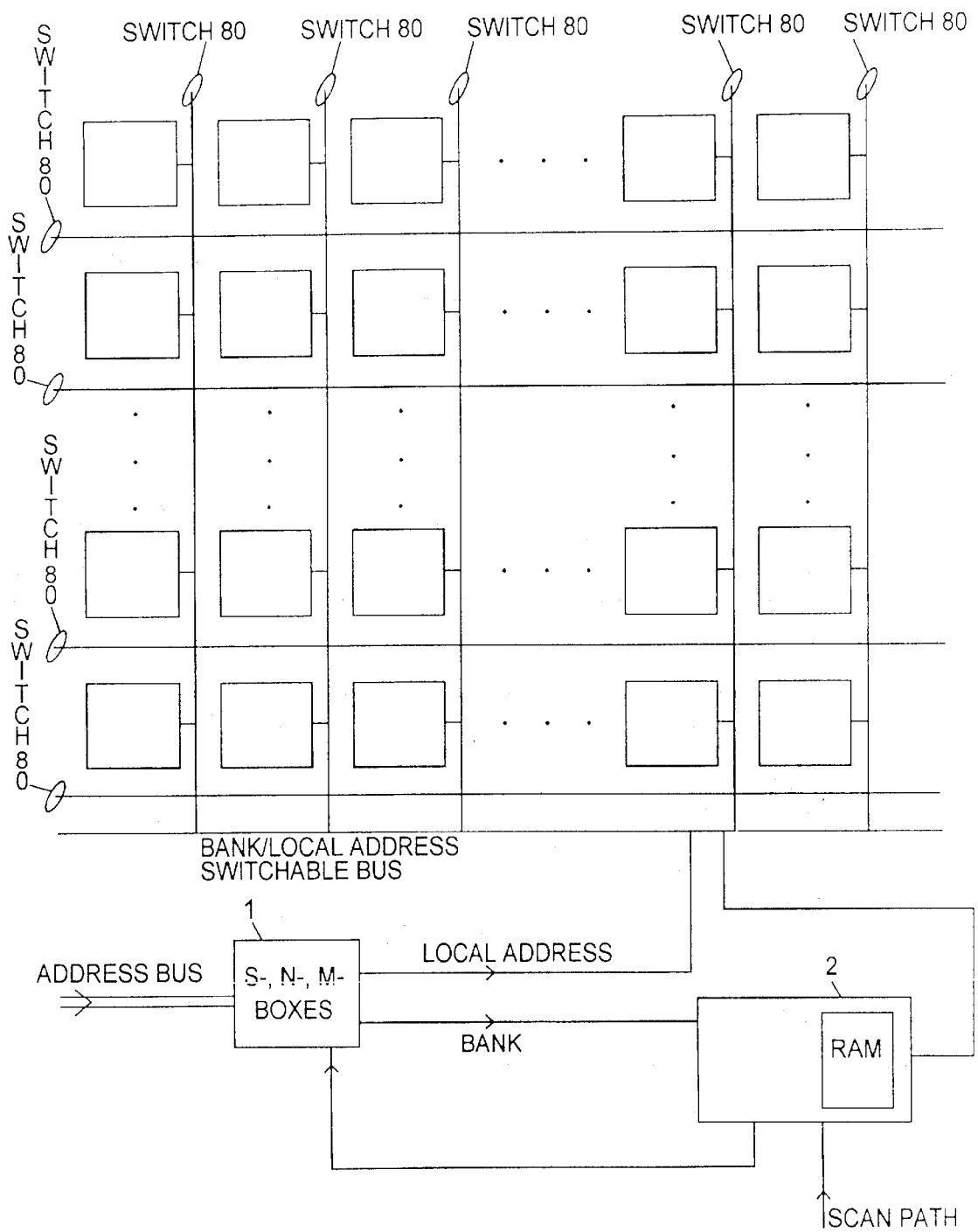
FIG. 8 illustrates an embodiment of the present invention connected to a single memory array in a switchable bus architecture.

The place or places where the list of defective or non-defective elements is stored depends on the type of memory system placed on a chip. In a chip representing a single memory module with a single memory bus for all memory elements, as shown in FIG. 7, or a single memory module with a switchable bus, as shown in FIG. 8, there is a single place for storing the list (the non-defective bank table and address translation parameter values) and a single place for the re-mapping and scrambling circuitry, i.e., memory area 2 and translation unit 1. (Non-defecting banks in FIG. 7 are labeled 60 and defective banks are labeled 61.)

Figure 9:
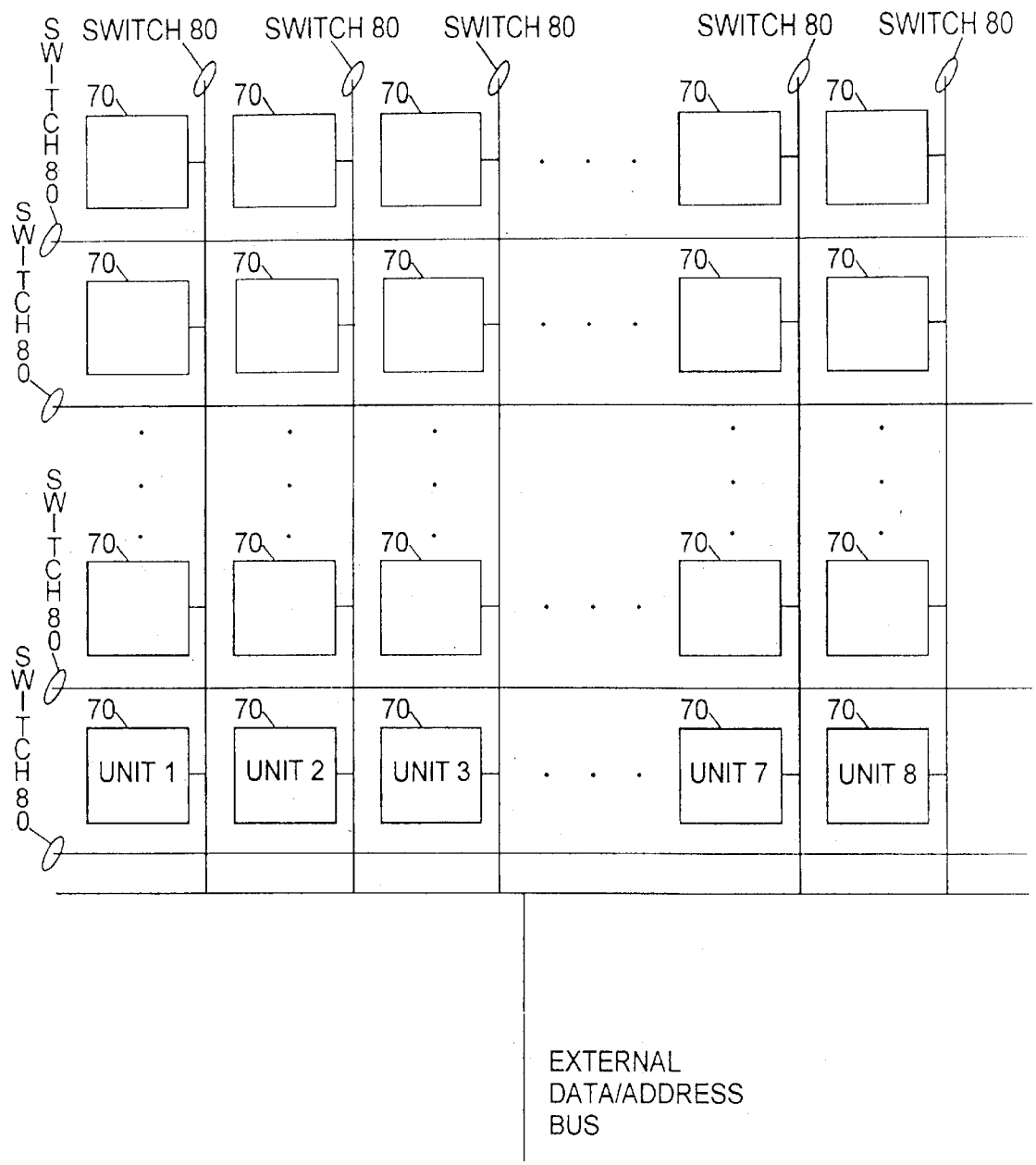
FIG. 9 illustrates a multi-processor and memory system.
Figure 10:
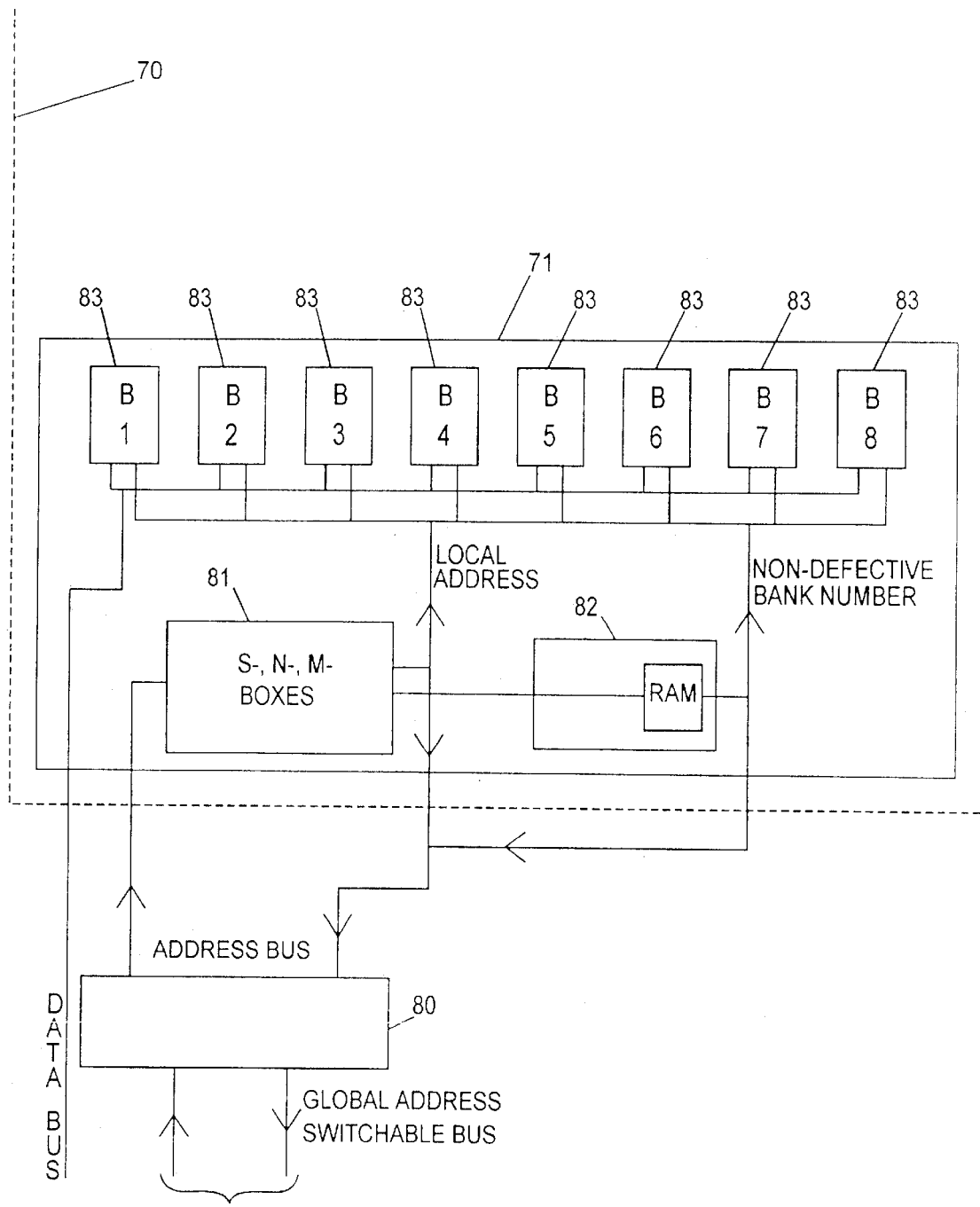
FIG. 10 illustrates an embodiment of the present invention connected to a local memory unit in a multi-processor and memory system.

However, in a system-on-a-chip, having possibly multiple processing units accessing multiple memory units and banks, as shown in FIGS. 9 and 10, the list of defective, or non-defective, units is stored in a distributed fashion with individual processing units (or clusters thereof). Additionally, re-mapping and scrambling circuitry is placed together with individual processing units (or their clusters). This significantly increases the need for a minimal gate implementation of the re-mapping and scrambling circuitry and makes the implementation of FIGS. 1–6 the preferred one. FIG. 9 shows a multiprocessor and memory system comprising units 70. FIG. 10 shows memory-related portions of an individual unit 70. Translation unit 81 and memory area 82 control access to local memory units (sub-banks) B1–B8 83. Switch 80 routes local and global addresses and control bits and routing information of the memory data in and out of the individual units (70) from and to the communication switch of the complete system on-a-chip.

The purpose of the proposed re-mapping circuitry (or its software implementation) is to allow for fault-tolerant operation of large systems with many memory and processing elements where large number of failures of individual memory or processing components has to be tolerated without degradation of system performance. The only degradation is the graceful decrease in available storage (or processor performance). The address translation and scrambling unit guarantees the same quality of memory access and high bandwidth to the usable (non-defective) memory system.

Alternatively, if a fixed number of memory banks and/or processing units is required to be present on the chip, the proposed fault tolerant solution allows for a specific number of additional (so called spare or reserved) memory banks and/or processing units to be added to the chip. The number of such spare banks or units is determined by yield and process factors and can be variable. In addition, a system may be configured so that some of the memory banks are ignored for other reasons. The system disclosed herein allows for such variability. The alternative approach with spare banks or units effectively hides from the user the inevitable existence of defects and faulty components on the chip. In addition, in mission-critical applications, where failure is unacceptable, one can run continuously a verification of the inner working of the chip, by comparing, say 3 processor/memory units working on identical tasks. This allows for dynamic live verification of individual components, allowing them to be taken off-line live without any interruption of the chip operation. Combined with the spare concept, this can keep the chip operating without any degradation allowing for failures during the chip's life and operations.

Many variations on the embodiments described above are possible and readily apparent to those skilled in the art and the invention is not limited to those embodiments. For example, the circuitry shown in the embodiment above can readily be changed and optimized for particular hardware and may comprise greater or fewer circuits and components. Furthermore, in addition to hardware implementations in the form of on-the-chip circuitry and combinations of discrete components, the present invention may be implemented in software that remaps virtual address accesses to physical memory or reorganizes accesses to various memory arrays available to a program. In addition, although certain embodiments of the invention were described in connection with a 19-bit (word or cache line) address space and a specific maximum number of banks and sub-banks, the invention can readily be adapted to a larger or smaller address space and a greater or smaller variable number of banks and sub-banks and processing units.

What is claimed is:

1. A method of designing a memory device having a maximum number, C, of functioning memory banks and an expected minimum number, J, of functioning memory banks, each functioning memory bank comprising a plurality of addressable memory locations, each memory locations having a logical address, a, and a corresponding physical address, the physical address comprising a memory bank number and a local address, the method comprising:

providing an address translation unit that derives the physical address comprising the bank number and the local address from ranges of bits in the result of the modular multiplication $\Lambda \cdot a'$, where a' comprises ranges of bits of logical address a, and $\Lambda$ represents an integer not equal to 1, wherein $\Lambda$ is determined by:
   (a) setting $\Lambda$ to a range of values;
   (b) computing, for each value of $\Lambda$ and number of memory banks between J and C, the deviation from a uniform distribution of bank numbers over at least one explicit access sequence;
   (c) selecting $\Lambda$ from the values that result in minimal deviations for every number of memory banks between J and C.

2. The method of claim 1, where J is 51, C is 64, and $\Lambda$ is selected to be 243.

3. The method of claim 1, where J is 53, C is 64, and $\Lambda$ is selected to be 235.

4. The method of claim 1, where J is 57, C is 64, and $\Lambda$ is selected to be 107.

5. The method of claim 1, wherein the at least one explicit access sequence comprises a stride one access sequence.

* * * * *